United States Patent [19]
Masaki

[11] Patent Number: 5,715,005
[45] Date of Patent: Feb. 3, 1998

[54] VIDEO CODING APPARATUS AND VIDEO DECODING APPARATUS WITH AN IMPROVED MOTION VECTOR CODING METHOD

[75] Inventor: Shoichi Masaki, Osaka, Japan

[73] Assignee: Matsushita Electric Industrial co., ltd., Osaka-fu, Japan

[21] Appl. No.: 265,374

[22] Filed: Jun. 23, 1994

[30] Foreign Application Priority Data

Jun. 25, 1993 [JP] Japan .................................. 5-154775

[51] Int. Cl.⁶ .................. H04N 7/32; H04N 7/30
[52] U.S. Cl. ............. 348/416; 348/699; 348/402; 348/407; 348/409; 348/412; 348/413; 348/415
[58] Field of Search ..................... 348/416, 699, 348/402, 407, 412, 415, 413, 431, 390, 409; H04N 7/30, 7/32

[56] References Cited

U.S. PATENT DOCUMENTS

| | | | |
|---|---|---|---|
| 4,691,230 | 9/1987 | Kaneko et al. | 348/416 |
| 4,710,810 | 12/1987 | Koga | 348/416 |
| 5,105,271 | 4/1992 | Niihara | 348/699 |
| 5,126,841 | 6/1992 | Tanaka et al. | 348/415 |
| 5,327,232 | 7/1994 | Kim | 348/412 |
| 5,337,086 | 8/1994 | Fujinami | 348/402 |
| 5,400,076 | 3/1995 | Iwamura | 348/416 |
| 5,442,400 | 8/1995 | Sun et al. | 348/413 |

FOREIGN PATENT DOCUMENTS

| | | | |
|---|---|---|---|
| 0979217 | 7/1990 | European Pat. Off. | H04N 7/32 |
| 0551599 | 7/1993 | European Pat. Off. | H04N 7/32 |
| 468986 | 3/1992 | Japan | H04N 7/30 |
| 4186985 | 7/1992 | Japan | H04N 7/32 |
| 4347987 | 12/1992 | Japan | H04N 7/32 |
| 5153574 | 6/1993 | Japan | H04N 7/32 |

OTHER PUBLICATIONS

"Resynchronization of Motion Compensated Video Affected by ATM Cell Loss", by P. Haskell et al., ICASSP-92, vol. 3, Mar. 1992, pp. 545-548.

*Primary Examiner*—Tommy P. Chin
*Assistant Examiner*—Vu Le
*Attorney, Agent, or Firm*—Price, Gess & Ubell

[57] ABSTRACT

A motion picture coding and decoding apparatus divides each frame of a motion picture into a plurality of blocks and for providing a prediction error to each of the blocks between a target frame and a reference frame. A motion vector is coded for each block and stored for both the target frame and the reference frame. A differential motion vector is determined based upon the motion vector of the target frame and a corresponding block in the reference frame. The differential motion vector is then coded and multiplexed with the coded prediction error and output on a transmission path. The coded data is then decoded and the differential motion vector and a motion vector of a corresponding block from a reference frame can thereby be added to obtain a motion vector to be used for decoding the prediction error. Additionally, an error detection unit can detect the presence of an error in the coded differential motion vector, and a prevention unit can be used to prevent processing an erroneous differential motion vector, while an error amendment unit can substitute a motion vector of a predetermined block instead of the motion vector having the error.

29 Claims, 27 Drawing Sheets

Fig. 8 motion vector coding

| motion vectors (MVD) | codes | | | |
|---|---|---|---|---|
| -16&16 | 0000 0011 001 | 1 | 010 | |
| -15&17 | 0000 0011 011 | 2&-30 | 0010 | |
| -14&18 | 0000 0011 101 | 3&-29 | 0001 0 | |
| -13&19 | 0000 0011 111 | 4&-28 | 0000 110 | |
| -12&20 | 0000 0100 001 | 5&-27 | 0000 1010 | |
| -11&21 | 0000 0100 011 | 6&-26 | 0000 1000 | |
| -10&22 | 0000 0100 11 | 7&-25 | 0000 0110 | |
| -9&23 | 0000 0101 01 | 8&-24 | 0000 0101 10 | |
| -8&24 | 0000 0101 11 | 9&-23 | 0000 0101 00 | |
| -7&25 | 0000 0111 | 10&-22 | 0000 0100 10 | |
| -6&26 | 0000 1001 | 11&-21 | 0000 0100 010 | |
| -5&27 | 0000 1011 | 12&-20 | 0000 0100 000 | |
| -4&28 | 0000 111 | 13&-19 | 0000 0011 110 | |
| -3&29 | 0001 1 | 14&-18 | 0000 0011 100 | |
| -2&30 | 0011 | 15&-17 | 0000 0011 010 | |
| -1 | 011 | | | |
| 0 | 1 | | | |

FLC of motion vectors

VLC of differential motion vectors differential motion vectors : 0 ······ 1
1 ······ 010
-1 ······ 011
2 ······ 0011
-2 ······ 0010

Fig. 18

| predictions | MQUANT | MVD variable | MVD fixed | CBP | TCOEFF | codes |
|---|---|---|---|---|---|---|
| INTRA | | | | | ○ | 0000 01 |
| INTRA | ○ | | | | ○ | 0000 0000 01 |
| INTER | | | | ○ | | 1 |
| INTER | ○ | | | ○ | ○ | 0000 001 |
| INTER + MC | | ○ | | ○ | ○ | 0000 0000 001 |
| INTER + MC | | ○ | | ○ | ○ | 0000 0000 0001 |
| INTER + MC | | | ○ | | | 0000 0000 0000 1 |
| INTER + MC | | | ○ | | | 0000 0000 0000 01 |
| INTER + MC | ○ | ○ | | ○ | ○ | 0000 0000 0000 001 |
| INTER + MC | ○ | ○ | | ○ | ○ | 0000 0000 0000 0001 |
| INTER + MC + FIL | ○ | ○ | | ○ | ○ | 01 |
| INTER + MC + FIL | | ○ | | ○ | ○ | 001 |
| INTER + MC + FIL | | ○ | | | | 0001 |
| INTER + MC + FIL | | | ○ | | | 0000 1 |
| INTER + MC + FIL | ○ | | ○ | ○ | ○ | 0000 0001 |
| INTER + MC + FIL | ○ | | ○ | ○ | ○ | 0000 0000 1 |

○ indicates the presence of each element in the macro block

FLC of motion vectors

VLC of differential motion vectors differential motion vectors : 0 ······ 1
1 ······ 010
-1 ······ 011
2 ······ 0011
-2 ······ 0010

Fig. 25A
when a motion vector is coded by a fixed length code
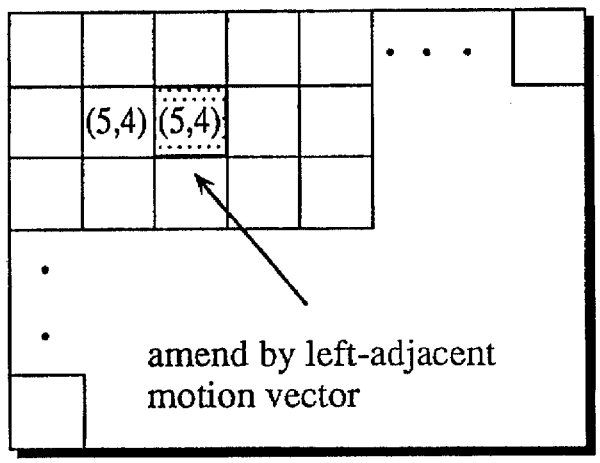
Fig. 25B
when a motion vector is coded by a variable length code
motion vector after amendmend          motion vector in previous frame
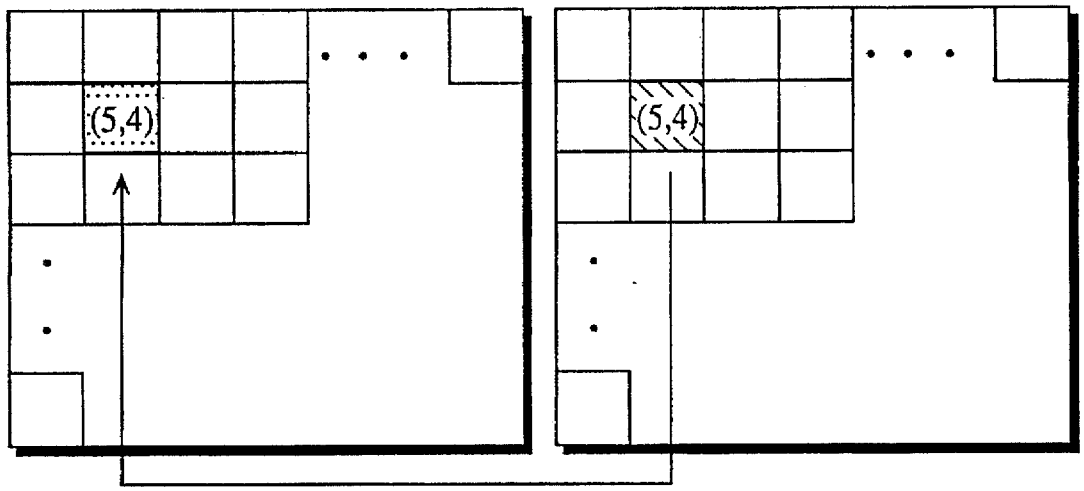
amend by motion vector in previous frame
 : block with the same reference number as block with motion vector error
 : block with motion vector error

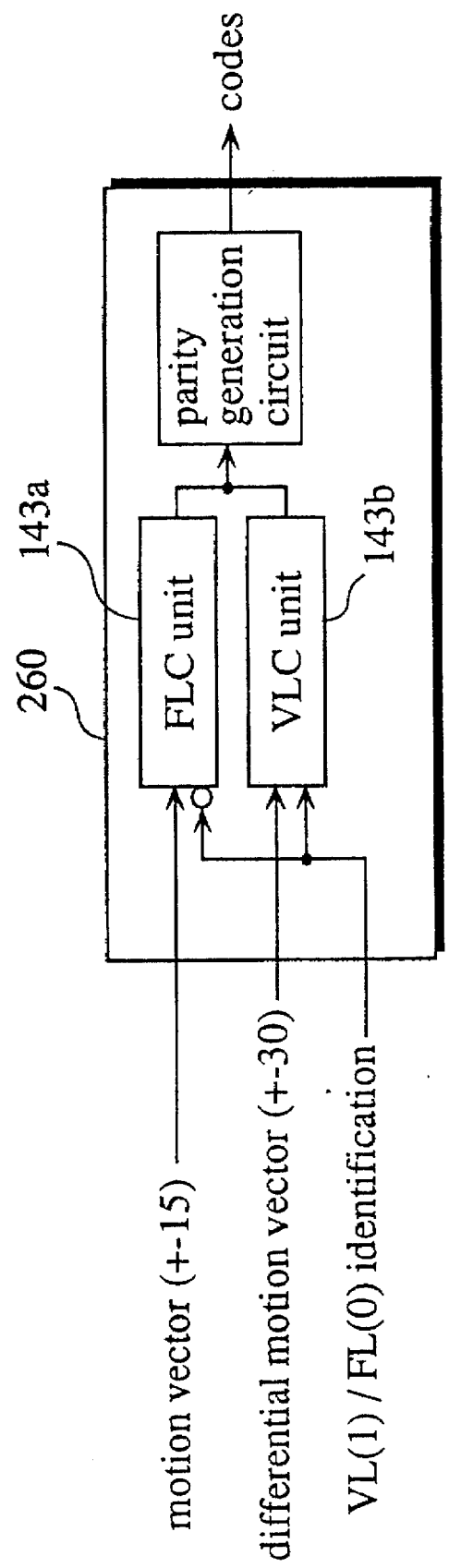

Fig. 27A

VLC of differential motion vectors

```
  0 : 1         ····   1 0                    parity bits
  1 : 0 1 0     ····   0 1 0 0
 -1 : 0 1 1     ····   0 1 1 1
  2 : 0 0 1 1   ····   0 0 1 1 1
 -2 : 0 0 1 0   ····   0 0 1 0 0
```

Fig. 27B

FLC of motion vectors

```
   0 : 0 0 0 0 0  ····   0 0 0 0 0 1        parity bits
   1 : 0 0 0 0 1  ····   0 0 0 0 1 0
  -1 : 1 0 0 0 1  ····   1 0 0 0 1 1
   2 : 0 0 0 1 0  ····   0 0 0 1 0 0
  -2 : 1 0 0 1 0  ····   1 0 0 1 0 1
   3 : 0 0 0 1 1  ····   0 0 0 1 1 1
  -3 : 1 0 0 1 1  ····   1 0 0 1 1 0
                   ⋮                          ⋮
  15 : 0 1 1 1 1  ····   0 1 1 1 1 1
 -15 : 1 1 1 1 1  ····   1 1 1 1 1 0
```

VIDEO CODING APPARATUS AND VIDEO DECODING APPARATUS WITH AN IMPROVED MOTION VECTOR CODING METHOD

BACKGROUND OF THE INVENTION

(1) Field of the Invention

The present invention relates to an improvement in coding/decoding operations for motion vectors, which indicate transition of moving pictures in consecutive frames, in order to lessen image deterioration caused by transmission errors in video coding apparatuses and video decoding apparatuses.

The video coding apparatuses code the difference between motion vectors and the video decoding apparatuses decode the difference between images which are closely related.

(2) Description of the Related Art

Various arts for processing digitalized motion pictures have been realized these days. Generally, picture data are transmitted in a large amount so that it is necessary to compress or reduce the data in volume in order to make them available for recording or transmission.

One example of such a method for coding motion pictures with the use of motion vectors is "ITU (International Telecommunication Union) Recommendation H.261 Video Codec for Audiovisual Services".

According to this method, a frame which is to be coded (hereinafter a target frame) is divided into several blocks and then a motion picture in a block is compared with a motion picture in an area for one block in a frame preceding the target frame (hereinafter a previous frame), thereby detecting a motion vector. Since this motion vector indicates the area for one block in the previous frame which has the closest correlation with the block in the target frame, the difference between the block and the area and the difference between the motion vectors are both coded for transmission. Various corporations have produced various LSIs having such a coding function such as IIT Vision Processor, NEC VSP3, Mitsubishi DISP, OKI MSM752, and Matushita VDSP(MN195901).

FIG. 1 shows the construction of a conventional video coding apparatus based on the above-mentioned ITU Recommendation H.261.

The apparatus includes a motion picture signal reception terminal 711, a conversion unit 712, a motion vector detection unit 713, a frame memory 714, a motion compensation unit 715, a delay unit 716, a differential unit 717, a quantization unit 718, an inverse quantization unit 719, an addition unit 71a, a variable length coding unit 71b, a differential motion vector detection unit 71c, a motion vector variable length coding unit 71d, a multiplexer coding unit 71e, a transmission unit 71f, a code output terminal 71g, and a coding control unit 71h.

The motion picture signal reception terminal 711 receives digitalized motion picture signals which are composed of a plurality of frames consecutive in time. Each frame has 352×288 pixels for luminosity information, and 176×144 pixels for color difference information, in accordance with CIF (Common Intermediate Format) defined in H. 261. The CIF, if necessary, may be converted into QCIF (Quater CIF) in which there are half as many as pixels in the horizontal and vertical directions.

The conversion unit 712 divides motion picture data inputted through the motion picture signal reception terminal 711 into blocks each having 8×8 pixels, thereby outputting in block units. As a result, one frame is divided into blocks each having 22×18 pixels in X and Y directions. Actually, in the case of colored pictures, the following process is carried out per macro block, which is composed of six blocks (four luminosity blocks with luminosity information and two color difference blocks with color difference information). In the process, luminosity blocks, color difference blocks, and macro blocks are all referred to as just blocks unless it is necessary to distinguish one from the others.

The motion vector detection unit 713 detects a motion vector of the block outputted from the conversion unit 712, by referring to the previous frame stored in the frame memory.

The frame memory 714 which has an area for storing a target frame which has been sequentially sent in blocks via the addition unit 71a and another area for storing the previous frame which has been sent in the same manner as the target frame.

The motion compensation unit 715 selects a block indicating a prediction value from the previous frame stored in the frame memory 714, based on the motion vector detected by the motion vector detection unit 713, thereby outputting the selected block to the differential unit 717 and the addition unit 71a. The prediction value is the motion picture data contained in the block on the previous frame pointed by the motion vector. In other words, which block on the previous frame corresponds to the block to be coded on the target frame is predicted.

The delay unit 716 holds a block to be coded among the blocks divided in the conversion unit 712 and outputs the block to the differential unit 717 by delaying one cycle period for coding the block.

The differential unit 717 finds the difference between the block to be coded sent from the delay unit 716 and a prediction value sent from the motion compensation unit 715, thereby outputting the difference to the quantization unit 718. The difference is called a prediction error because it is between the block to be coded and a block indicating a prediction value.

The quantization unit 718 DCT-converts the block indicating the prediction error and quantizes the DCT-converted block, thereby outputting the DCT-converted block to the inverse quantization unit 719 and the variable length coding unit 71b (hereinafter VLC unit 71b).

The inverse quantization unit 719 inverse quantizes the quantized prediction error and DCT-converts the inverse quantized prediction error, thereby outputting it to the addition unit 71a.

The addition unit 71a reproduces the block to be coded by adding an output of the inverse quantization unit 719 and the block (prediction value) selected by the motion compensation unit 715, thereby outputting the reproduced block to the frame memory 714.

The VLC unit 71b applies a variable length coding operation to the prediction error that has been quantized in the quantization unit 718.

The differential motion vector detection unit 71c receives the motion vector detected by the motion vector detection unit 713, finds the difference between the motion vector of a block to be coded and the motion vector of the block located on the left of the block to be coded, thereby outputting the found difference to the motion vector variable length coding unit 71d (hereinafter motion vector VLC unit 71d).

The motion vector VLC unit 71d applies a variable coding operation to the differential motion vector detected by the differential motion vector detection unit 71c, thereby outputting to the multiplexer coding unit 71e.

The multiplexer coding unit 71e multiplexes the prediction error which has been coded by the VLC unit 71b and the differential motion vector which has been coded by the motion vector VLC unit 71d.

The transmission unit 71f outputs multiplexed codes through the code output terminal 71g.

The coding control unit 71h controls a coding process such as a designation of quantization characteristics for the quantization unit 718, and outputs flags each indicating a coding mode to the multiplexer coding unit 71e.

FIG. 2 shows the construction of a conventional video decoding apparatus based on the above-mentioned ITU Recommendation H.261.

The apparatus includes a code reception 721, a code reception unit 722, a demultiplexer decoding unit 723, a prediction error decoding unit 724, an inverse quantization unit 725, a motion vector decoding unit 726, a motion vector addition unit 727, a frame memory 728, a motion compensation unit 729, an addition unit 72a, and a motion picture signal output terminal 72b.

The code reception terminal 721 receives multiplexed and coded motion picture signals and forwards them to the demultiplexer decoding unit 723 via the code reception unit 722.

The demultiplexer decoding unit 723 divides the coded motion picture signal into a coded prediction error and a coded differential motion vector, thereby outputting the former to the prediction error decoding unit 724 and the latter to the motion vector decoding unit 726 both in blocks.

The prediction error decoding unit 724 decodes a coded prediction error and then outputs to the inverse quantization unit 725. The output indicates the quantized prediction error.

The inverse quantization unit 725 inverse quantizes the quantized prediction error and then inverse DCT-converts the inverse quantized prediction error, thereby outputting to the addition unit 72a.

The motion vector decoding unit 726 decodes a coded differential motion vector, thereby outputting to the motion vector addition unit 727. The output indicates a differential motion vector.

The motion vector addition unit 727 adds the differential motion vector sent from the motion vector decoding unit 726 and the motion vector of the block located on the left of the block corresponding to the differential motion vector. Then, the unit 727 outputs the resulting motion vector to the motion compensation unit 729.

The frame memory 728 which has an area for storing each block in a reproduced frame which has been in a previous cycle and another area for storing each block in a frame to be reproduced, which is sent from the addition unit 72a.

The motion compensation unit 729 selects a prediction value from the previous frame stored in the frame memory 728, based on the received motion vector, thereby outputting the selected prediction value to the addition unit 72a.

The addition unit 72a adds the prediction error sent from the inverse quantization unit 725 and the prediction error sent from the motion compensation unit 729, thereby outputting the result to the frame memory 728 and the motion picture signal output terminal 72b. The result of this addition indicates motion picture data reproduced in blocks.

However, these conventional video coding and decoding apparatuses have the following problem.

When a transmission error has occurred in a motion vector, the error not only affects the block having the motion vector but also spreads to other blocks. As a result, not only a picture on the block whose motion vector has the error but also pictures on the other blocks which have been successfully transmitted are damaged. The spread of an error is resulted from that the difference is detected between motion vectors of a block and a block in the left of the block in the same frame. According to the H.261, the spread of an error may damage one-ninth of the entire frame in the case of QCIF and one-thirty-sixth in the case of CIF at worst respectively.

The H.261, which is operable at a comparative low speed of between 64 Kbit/s and 2 Mbit/s, is suitable for video telephone with digital telephone, video conference, and other audiovisual services. The above described problem does matter especially when motion pictures are coded via a digital codeless telephone because transmission errors caused by random error/fading are inevitable in a codeless telephone.

SUMMARY OF THE INVENTION

A first object of the present invention is to provide an apparatus and method for coding motion pictures and an apparatus and method for decoding the motion pictures in which prediction errors and motion vectors can be coded in block units even if the motion vectors suffer from transmission error while they are being coded, without damaging other blocks whose motion vectors have been successfully coded.

A motion picture coding apparatus that can achieve the first object comprises the following units:

A motion vector storage unit for storing motion vectors of all blocks in a reference frame, a motion vector detection unit for detecting a motion vector of each block in a target frame based on the reference frame, a differential motion vector detection unit for detecting a differential motion vector between a motion vector detected by the motion vector detection unit and a motion vector of a corresponding block in the reference frame, a differential motion vector coding unit for coding the differential motion vector detected, the coded differential motion vector being multiplexed with the coded prediction error and outputted on a transmission path.

The motion vector storage unit may have a first area for sequentially storing detected motion vectors for a first frame and a second area for sequentially storing detected motion vectors for a second frame which follows the first frame, whereby either the first area or the second area always holds motion vectors of all blocks in a reference frame.

A motion picture decoding apparatus that can achieve the first object comprises the following units.

A motion vector storage unit for storing motion vectors of all blocks in the reference frame, a differential motion vector decoding unit for decoding a coded differential motion vector, thereby obtaining a differential motion vector, and a motion vector addition unit for adding the differential motion vector obtained by the differential motion vector decoding unit and a motion vector of a corresponding block in the reference frame, thereby obtaining a motion vector to be used for decoding the prediction error.

The motion vector storage unit may have a first area for sequentially storing motion vectors for a first frame, which have been obtained in the motion vector addition unit and a second area for sequentially storing detected motion vectors for a second frame which follows the first frame, whereby either the first area or the second area always holds motion vectors of all blocks in a reference frame.

A motion picture coding method that can achieve the first object comprises the steps of the following: storing motion vectors of all blocks in the reference frame to a memory; detecting a motion vector of each block in the target frame to a corresponding block in the reference frame; detecting a differential motion vector between a motion vector detected by the motion vector detection step and a motion vector of a corresponding block in the reference frame stored in the memory; and coding the differential motion vector detected. The coded differential motion vector is multiplexed with the coded prediction error, thereby outputting on a transmission path.

The motion vector storing step may include an operation of sequentially storing detected motion vectors for a first frame to a first area of the memory and another operation of sequentially storing detected motion vectors for a second frame which follows the first frame to a second area of the memory, whereby either the first area or the second area of the memory always holds motion vectors of all blocks in a reference frame.

A motion picture decoding method that can achieve the first object comprises the steps of the following: storing motion vectors of all blocks in the reference frame to a memory; decoding a coded differential motion vector, thereby obtaining a differential motion vector; and adding the differential motion vector obtained in the decoding step and a motion vector of a corresponding block in the reference frame, thereby obtaining a motion vector to be used for decoding the prediction error.

The motion vector storing step may include an operation of sequentially storing motion vectors for a first frame, which are obtained in the motion vector addition step to a first area of the memory and another operation of sequentially storing detected motion vectors for a second frame which follows the first frame to a second area of the memory, whereby either the first area or the second area of the memory always holds motion vectors of all blocks in a reference frame.

According to these apparatuses and methods, an occurrence of a transmission error does not affect the other blocks because a differential motion vector is detected between each block in a target frame and a corresponding block in a reference frame. As a result, image deterioration resulted from a transmission error can be limited within a block whose motion vector suffers from the transmission error.

A second object of the present invention is to provide an apparatus and method for coding motion pictures and an apparatus and method for decoding the motion pictures in which motion vectors can be coded in shorter length to improve coding efficiency.

A motion picture coding apparatus that can achieve the second object comprises the following units:

A motion vector storage unit for storing motion vectors of all blocks in the reference frame, a motion vector detection unit for detecting a motion vector of each block in the target frame based on the reference frame, a differential motion vector detection unit for detecting a differential motion vector between a motion vector detected by the motion vector detection unit and a motion vector of a corresponding block in the reference frame, and a coding unit for coding a differential motion vector when a differential motion vector is equal or smaller than a predetermined threshold and for coding a motion vector when the differential motion vector is greater than the predetermined threshold. The coded prediction error, either the coded difference motion vector or the coded motion vector, and information indicating which one of the differential motion vector and the motion vector has been coded are multiplexed together and then outputted on a transmission path.

The motion vector storage unit may have a first area for sequentially storing detected motion vectors for a first frame and a second area for sequentially storing detected motion vectors for a second frame which follows the first frame, whereby either the first area or the second area always holds motion vectors of all blocks in a reference frame.

The coding unit may comprise a threshold holding unit for holding the predetermined threshold, a comparison unit for comparing the differential motion vector with the predetermined threshold; a fixed length coding unit for fixed length coding a detected motion vector when the differential motion vector is greater than the predetermined threshold, and a variable length coding unit for variable length coding the detected motion vector when the differential motion vector is equal or smaller than the predetermined threshold. The average of the variable length coded differential motion vector may be equal or smaller than the fixed length motion vector.

The comparison unit may compare each component of the differential motion vector with the predetermined threshold, the fixed length coding unit fixed length codes each component of the motion vector, and the variable length coding unit variable length codes each component for the differential motion vector.

The motion picture may be based on either of Common Intermediate Format or Quater Common Intermediate Format, both of which are defined by ITU Recommendation H. 261. The predetermined threshold may be 2, the fixed length code may be 5 bit long, and the variable length coding may be based on the International Telecommunication Union H. 261.

A motion picture decoding apparatus that can achieve the second object can be achieved by the above-mentioned motion picture decoding apparatus that can achieve the first object.

A motion picture coding method that can achieve the second object comprises the steps of the following: storing motion vectors of all blocks in the reference frame to a memory; detecting a motion vector of each block in the target frame to a corresponding block in the reference frame; detecting a differential motion vector between a first motion vector detected by the motion vector detection step and a motion vector of a corresponding block in the reference frame stored in the memory; and coding a differential motion vector when a differential motion vector is equal or smaller than a predetermined threshold and coding a motion vector when the differential motion vector is greater than the predetermined threshold. The coded prediction error, either the coded difference motion vector or the coded motion vector, and information indicating which one of the differential motion vector and the motion vector has been coded are multiplexed together and then outputted on a transmission path.

The motion vector storing step may include an operation of sequentially storing detected motion vectors for a first frame to a first area of the memory and another operation of sequentially storing detected motion vectors for a second frame which follows the first frame to a second area of the memory, whereby either the first area or the second area of the memory always holds motion vectors of all blocks in a reference frame.

The coding step may comprise the steps of the following: holding a predetermined threshold; comparing the differential motion vector with the predetermined threshold; fixed length coding a detected motion vector when the differential motion vector is greater than the predetermined threshold; and variable length coding a detected motion vector when the differential motion vector is equal or smaller than the predetermined threshold. An average of the variable length coded differential motion vector may be equal or smaller than the fixed length coded motion vector.

The comparing step may compare each component of the differential motion vector with the predetermined threshold, the fixed the length coding step may fixed length code for each component of the motion vector, and the variable length coding step may variable length code each component for the differential motion vector.

Another motion picture coding method that can achieve the second object comprises the steps of the following: dividing a target frame into a plurality of blocks, the target frame being a frame to be coded; detecting a motion vector of each block in the target frame to a corresponding block in a reference frame, the reference frame being a former target frame; coding a difference between a block having a detected motion vector and a corresponding block in the reference frame, the difference being the prediction error; decoding the prediction error, thereby reproducing a block having the detected motion vector; storing all reproduced blocks for the reference frame to a temporary storage unit and sequentially storing blocks reproduced in the decoding step to the temporary storage unit; storing motion vectors of all blocks in the reference frame to a memory; detecting a motion vector of each block in the target frame to a corresponding block in the reference frame; detecting a differential motion vector between a motion vector detected by the motion vector detection step and a motion vector of a corresponding block in the reference frame stored in the memory; coding a differential motion vector when a differential motion vector is equal or smaller than a predetermined threshold and coding a motion vector when the differential motion vector is greater than the predetermined threshold; and multiplexing either the coded differential motion vector or the coded motion vector with information indicating which one of the differential motion vector and the motion vector has been coded, and the coded prediction error, thereby outputting on the transmission path. The step of detecting a motion vector is based on the reference frame held in the memory.

A motion picture decoding method that can achieve the second object can be achieved by the above-mentioned motion picture decoding method that can achieve the first object.

According to the above-mentioned apparatuses and methods, variable length coding and fixed length coding are selectively applied depending on whether a differential motion vector is greater than the threshold or not. As a result, motion vectors can be converted into a shorter length code.

When a motion picture based on CIF or QCIF defined in the above mentioned H. 261 is processed, the threshold is 2 so that all motion vectors can be 5 bit long or shorter.

A third object of the present invention is to provide an apparatus and method of decoding motion pictures in which image deterioration resulted from a transmission error can be minimized by amending the motion vector suffering from the transmission error.

The third object can be achieved by adding the following units to the above-mentioned motion picture decoding apparatus that can achieve the second object. The additional units are: an error detection unit for detecting a presence of an error in a coded differential motion vector, a prevention unit for preventing the motion vector storage unit and the motion vector addition unit from processing a differential motion vector, when the differential motion vector has been detected to have an error; and an amendment unit for, when a presence of an error has been detected, storing to the motion vector storage unit a motion vector of a predetermined block instead of a motion vector having the error, the predetermined block being stored in the motion vector storage unit.

The predetermined block may be either a block which is adjacent to the block whose motion vector has the error or a block which is located in a same position in the reference frame as the block whose motion vector has the error.

Another motion picture decoding apparatus that can achieved the third object comprises the following units:

A code distinction unit for distinguishing a fixed length coded motion vector from a variable length coded differential motion vector, based on a code distinction information sent from a motion picture coding apparatus, a fixed length decoding unit for decoding a motion vector which has been coded with a fixed length code, thereby outputting a motion vector, a variable length decoding unit for decoding a differential motion vector which has been coded with a variable length code, thereby outputting a differential motion vector, a motion vector storage unit for storing motion vectors of all blocks in the reference frame, a motion vector addition unit for adding the differential motion vector outputted from the variable length decoding unit and motion vectors of corresponding blocks in the reference frame, an error detection unit for detecting a presence of an error in a coded differential motion vector or a coded motion vector, a prevention unit for preventing the motion vector storage unit and the motion vector addition unit from processing a differential motion vector, when the differential motion vector has been detected to have an error, and an amendment unit for, when a presence of an error has been detected, storing to the motion vector storage unit a motion vector of a predetermined block instead of a motion vector having the error, the predetermined block being stored in the motion vector storage unit. The motion vector outputted from the fixed length decoding unit and the motion vector obtained by the motion vector addition unit are used for decoding the prediction error.

The predetermined block may be either a block which is adjacent to the block whose motion vector has the error or a block which is located in a same position in the reference frame as the block whose motion vector has the error.

The predetermined block may be a block which is adjacent to the block whose motion vector has the error, when the code distinction unit indicates a fixed length code, and may be a block which is located in a same position in the reference frame as the block whose motion vector has the error, when the code distinction unit indicates a variable length code.

The motion vector storage unit may have a first area for sequentially storing motion vectors for a first frame sent from the fixed length coding unit and the motion vector addition unit, and a second area for sequentially storing detected motion vectors for a second frame which follows the first frame, whereby either the first area or the second area always holds motion vectors of all blocks in a reference frame.

The fixed length decoding unit may decode each component of the coded motion vector, and the variable length decoding unit may decode each component for the coded differential motion vector.

A motion picture decoding method that can achieve the third object comprises the steps of the following: storing motion vectors of all blocks in the reference frame to a memory; decoding a coded differential motion vector, thereby obtaining a differential motion vector; adding the differential motion vector obtained in the decoding step and a motion vector of a corresponding block in the reference frame, thereby obtaining a motion vector to be used for decoding the prediction error; detecting a presence of an error in a coded differential motion vector; preventing the motion vector storing step and the motion vector adding step from processing a differential motion vector, when the differential motion vector has been detected to have an error; and when a presence of an error has been detected, amending a motion vector having the error by storing a motion vector of a predetermined block to the motion vector storing step.

The predetermined block may be either a block which is adjacent to the block whose motion vector has the error or a block which is located in a same position in the reference frame as the block whose motion vector has the error.

Another motion picture decoding method that can achieve the third object comprises the steps of the following: distinguishing a fixed length coded motion vector from a variable length coded differential motion vector, based on a code distinction information contained in a coded motion picture; decoding a motion vector which has been coded with a fixed length code, thereby outputting a motion vector; decoding a differential motion vector which has been coded with a variable length code, thereby outputting a differential motion vector; storing motion vectors of all blocks in the reference frame to a memory; adding the differential motion vector outputted in the first decoding step and motion vectors of corresponding blocks in the reference frame; detecting a presence of an error in one of a coded differential motion vector and a coded motion vector; preventing the motion vector storing step and the motion vector adding step from processing a differential motion vector, when the differential motion vector has been detected to have an error; and when a presence of an error has been detected, amending a motion vector having the error by storing a motion vector of a predetermined block to the motion vector storing step. The motion vector outputted in the first decoding step and the motion vector obtained from the adding step are used for decoding the prediction error. The predetermined block may be either a block which is adjacent to the block whose motion vector has the error or a block which is located in a same position in the reference frame as the block whose motion vector has the error.

The predetermined block may be either a block which is adjacent to the block whose motion vector has the error, when the code distinction step indicates a fixed length code, or a block which is located in a same position in the reference frame as the block whose motion vector has the error, when the code distinction step indicates a variable length code.

The motion vector storing step may include an operation of sequentially storing motion vectors for a first frame, which have been obtained in the fixed length decoding step and the motion vector addition step to a first area of the memory and another operation of sequentially storing detected motion vectors for a second frame which follows the first frame to a second area of the memory, whereby one of the first area and the second area of the memory always holds motion vectors of all blocks in a reference frame.

The fixed length decoding step may fixed length decode each component of the motion vector, and the variable length decoding step variable length may decode each component for the differential motion vector.

According to the above-mentioned apparatuses and methods, a motion vector having the closest correlation with the motion vector that suffers from a transmission error is used as an amending motion vector, so that image deterioration in the block whose motion vector has the error can be amended.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 shows a table of codes to be used when coding operation are carried out by the motion vector VLC unit 11e according to the first embodiment.

FIG. 18 is a table showing the MTYPE information including the fixed/variable identification signal and the code.

FIGS. 25A and 25B show amending operations of the error amendment unit 222 for motion vectors in a fixed length code and in a variable length code, respectively.

FIG. 26 shows the motion vector coding unit 260 provided with a parity generation unit 143c FIGS. 27A and 27B show codes which have been generated by the FLC unit 143a and VLC unit 143b respectively.

DESCRIPTION OF THE PREFERRED EMBODIMENTS

<Embodiment 1>
<1.1 Construction of Video Coding Apparatus>

Figure 1:
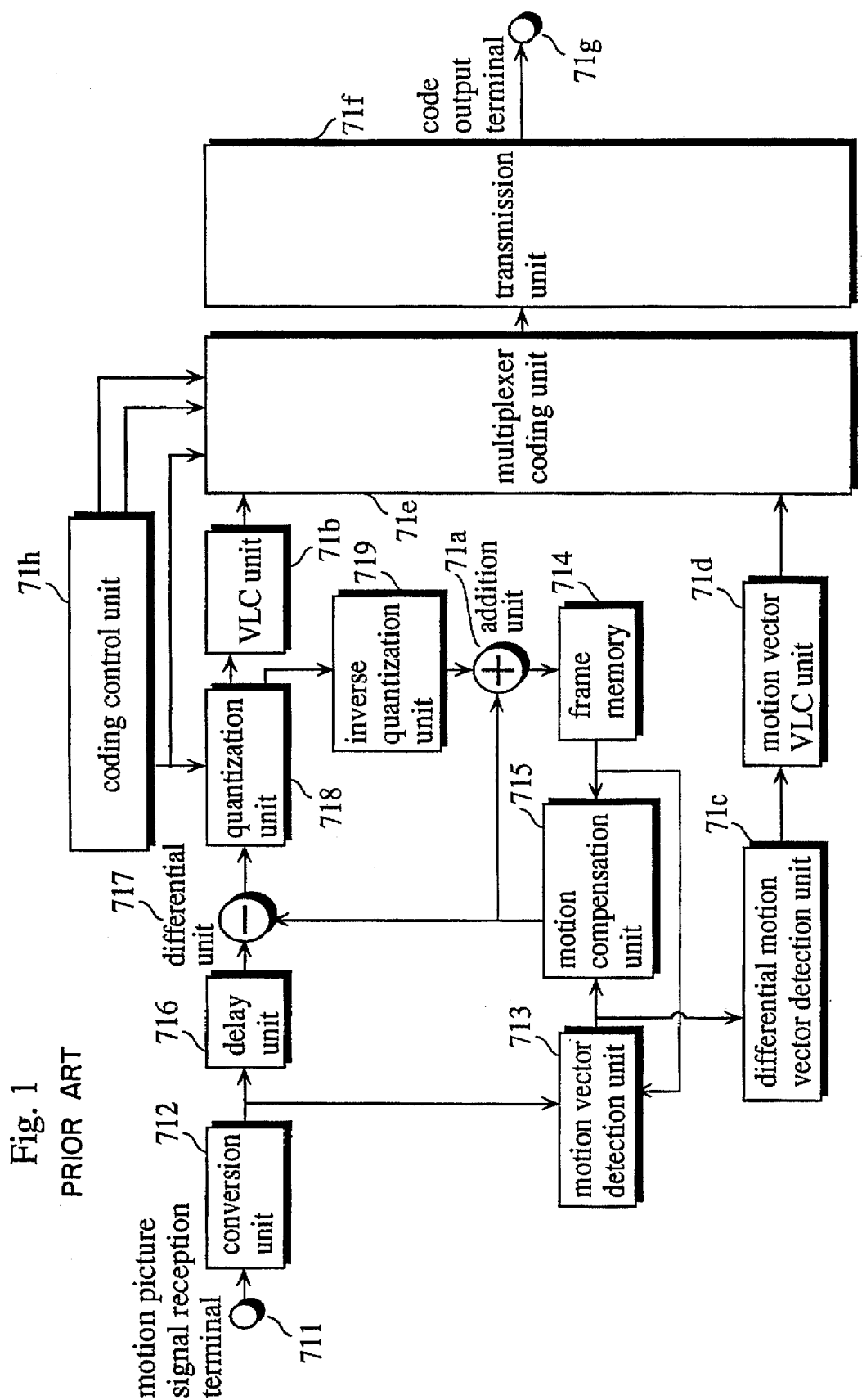
FIG. 1 shows the construction of a conventional video coding apparatus.
Figure 3:
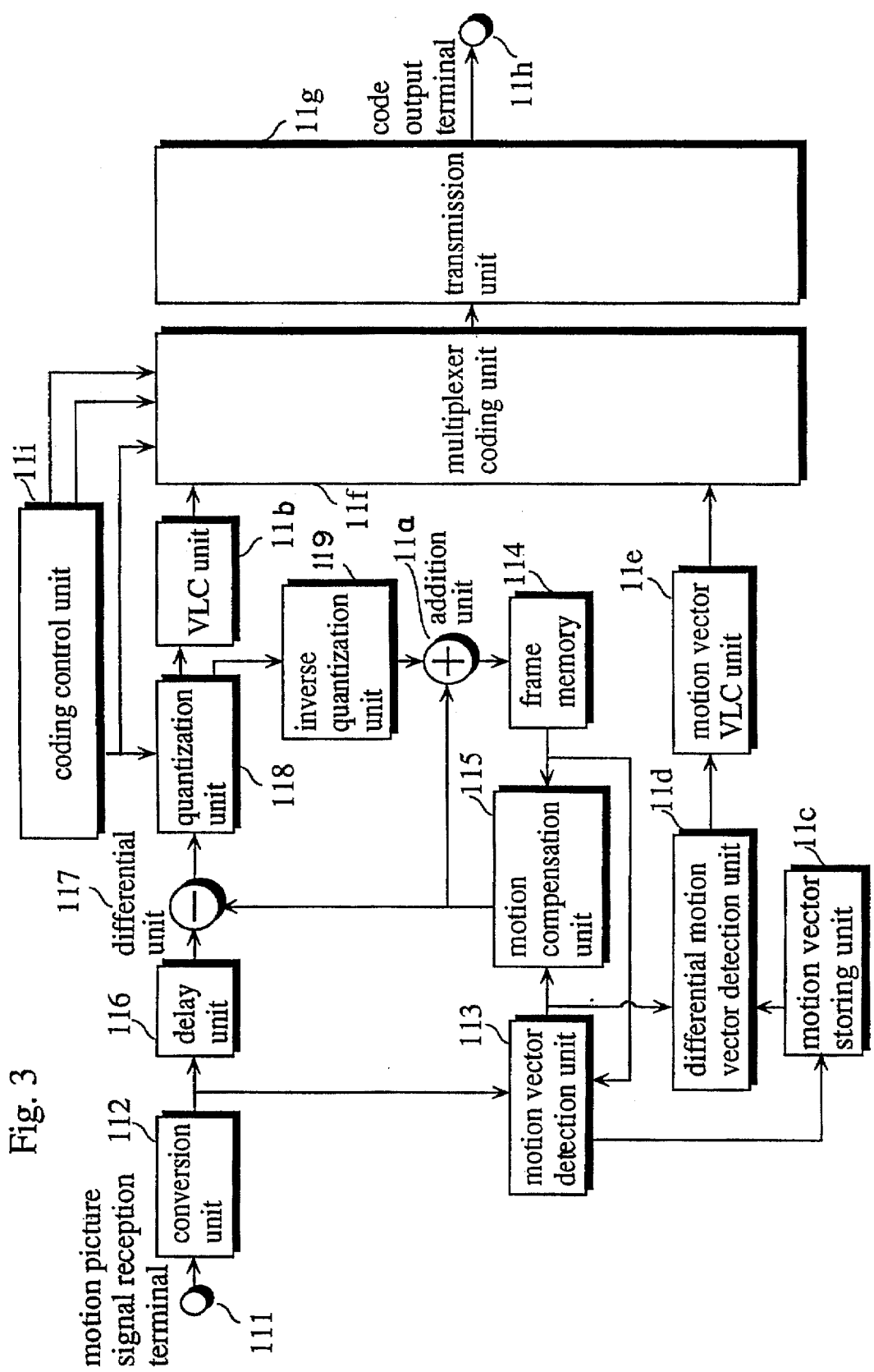
FIG. 3 shows the construction of the video coding apparatus of the first embodiment of the present invention.

FIG. 3 shows the construction of the video coding apparatus of this embodiment. The apparatus includes a motion picture signal reception terminal 111, a conversion unit 112, a motion vector detection unit 113, a frame memory 114, a motion compensation unit 115, a delay unit 116, a differential unit 117, a quantization unit 118, an inverse quantization unit 119, an addition unit 11a, a motion vector variable length coding unit 11e (hereinafter motion vector VLC unit 11e), a multiplexer coding unit 11f, a transmission unit 11g, a code output terminal 11h, and a coding control unit 11i. These components 111–119, 11a, 11e, 11f, and 11g are equal to their equivalents in FIG. 1 which shows the construction of the conventional video coding apparatus.

The motion picture signal reception terminal 111 receives digitalized motion picture signals which are composed of a plurality of frames consecutive in time. Motion picture data in the frames are based on the QCIF mentioned in the Related Art.

Figure 4:
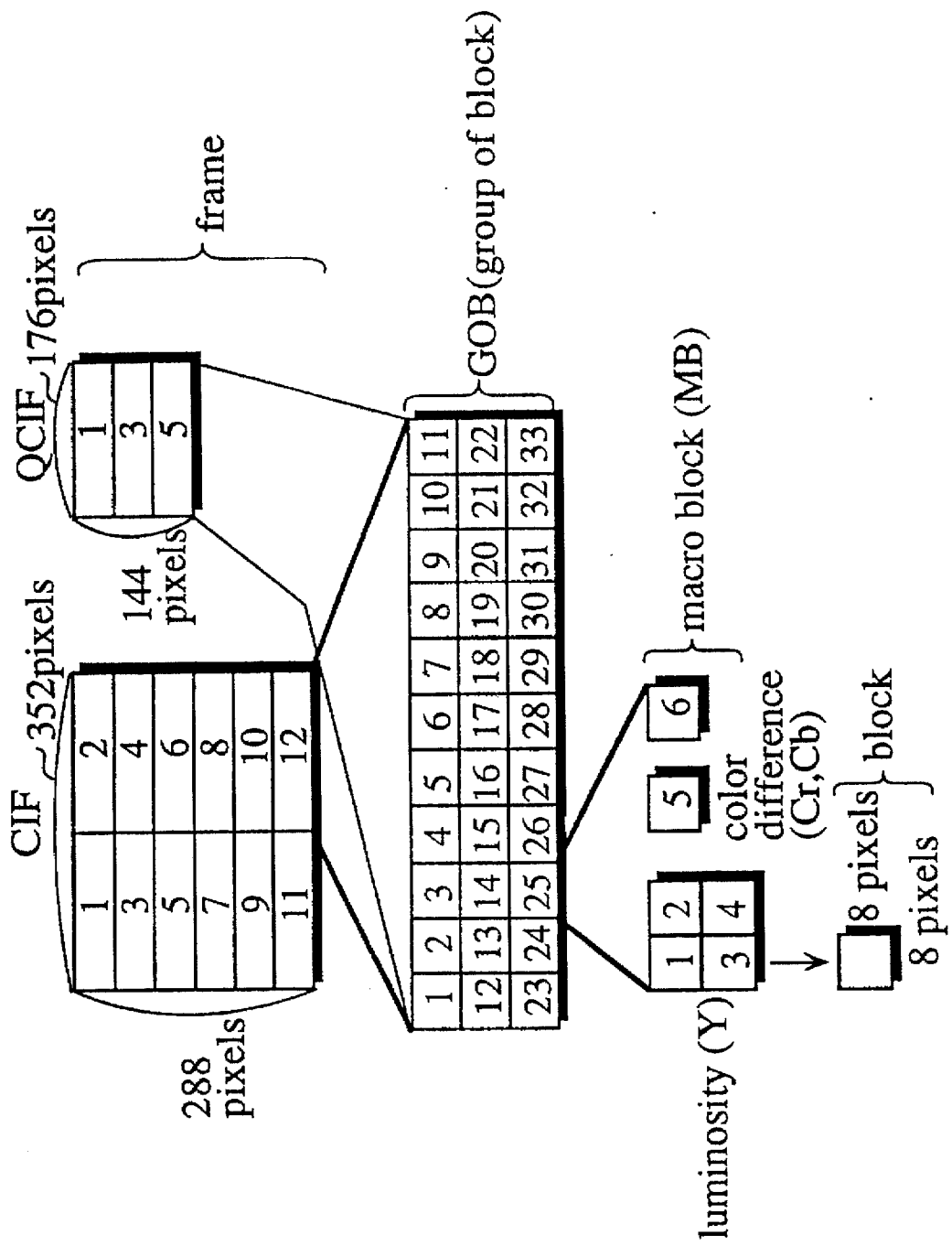
FIG. 4 shows the hierarchical structure of a frame according to the first embodiment.

As shown in FIG. 4, each motion picture data in QCIF and CIF has a four-layered structure composed of a frame, a GOB (group of block), a macro block, and a block. A frame is composed of motion picture data including luminosity information (Y) and color difference information (Cr) and (Cb). One frame is composed of three GOBs in QCIF, and of twelve GOBs in CIF. The number of pixels in the luminosity information is 176×144 in QCIF and 352×288 in CIF. The color difference information (Cr) and (Cb) has half as many pixels as the luminosity information both in the horizontal and vertical directions. Each GOB is composed of 33 macro blocks. Each macro block is composed of four luminosity blocks and two color difference blocks. Each luminosity block and each color difference block has 8×8 pixels. In this embodiment, the luminosity blocks, color difference blocks, and macro blocks are all referred to as just blocks unless they must be distinguished from the others.

The conversion unit 112 divides motion picture data inputted through the motion picture signal reception terminal 111 into blocks, thereby outputting them in block units.

The motion vector detection unit 113 detects a motion vector of the block outputted from the conversion unit 112, by referring to the previous frame stored in the frame memory 114.

The horizontal components and the vertical components of motion vectors are represented by an integer between −15 and +15, and one motion vector is detected per macro block (four luminosity blocks).

Figure 5:
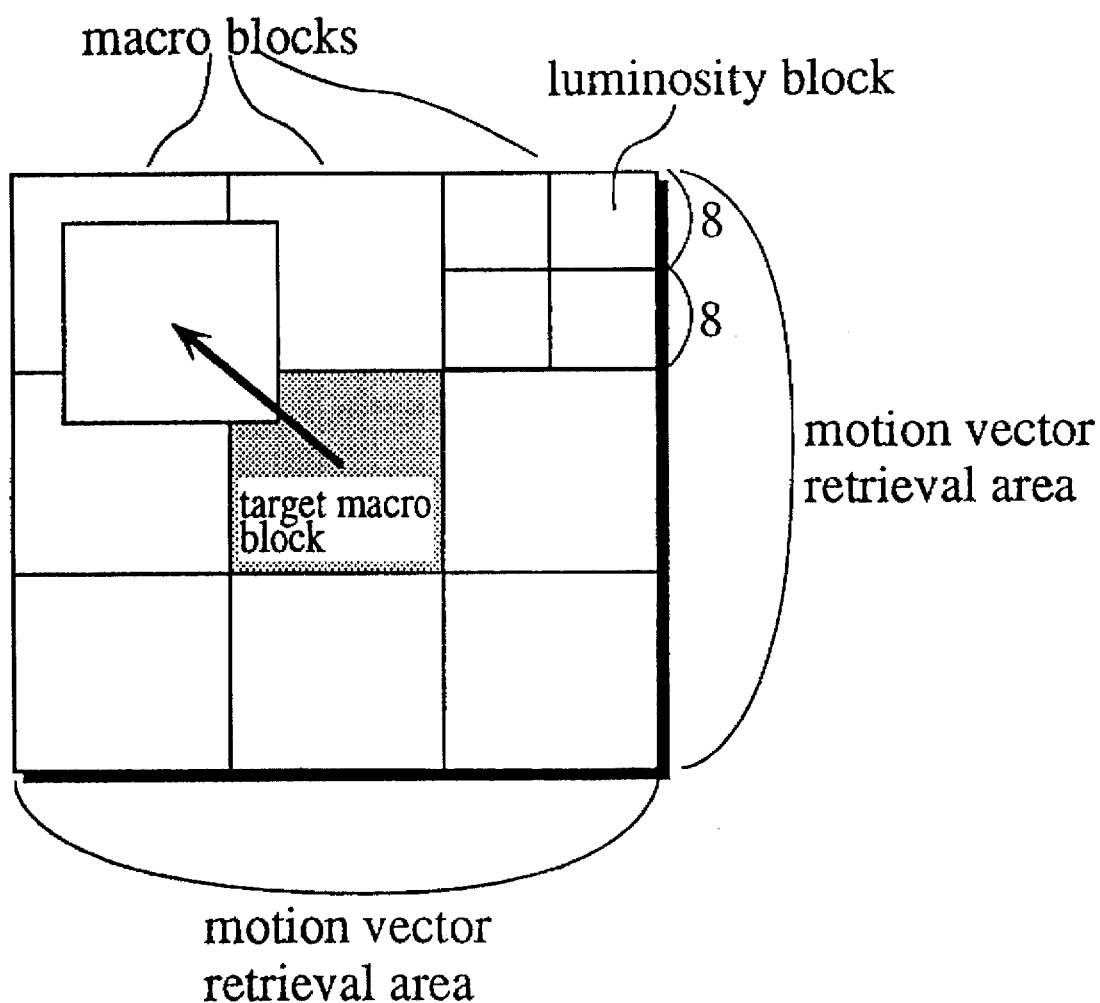
FIG. 5 shows an illustration to explain a motion vector detecting operation according to the first embodiment.

FIG. 5 explains a motion vector detecting operation. In the drawing, the hatched portion in the center indicates which area for one macro block in a previous frame the macro block to be coded corresponds to. The arrow indicates the motion vector between the macro blocks, and the macro block pointed by the arrow indicates a prediction value.

The motion vector detection unit 113 detects a motion vector from an area consisting of nine macro blocks, that is, the macro block to be coded and adjacent eight macro blocks. The area for one macro block (prediction value) to be indicated by the detected motion vector can stretch over more than one macro block. Furthermore, the motion vector detection unit 113 finds the motion vector for a color difference block by reducing each value in the horizontal and vertical components of the motion vector for the luminosity block by half.

The frame memory 114 which has an area for sequentially storing each block in a target frame via the addition unit 11a by reproducing the target frame in the manner to be described below and another area for storing each block in a frame preceding the target frame.

The motion compensation unit 115 extracts a block indicating the prediction value from the previous frame stored in the frame memory 114, based on the motion vector detected by the motion vector detection unit 113, thereby outputting the extracted block to the differential unit 117 and the addition unit 11a. The prediction value is the motion picture data contained in the block on the previous frame pointed by the motion vector. In other words, which block on the previous frame corresponds to the block to be coded is predicted.

The delay unit 116 holds the block to be coded and outputs it to the differential unit 117 by delaying one cycle period for coding the block.

The differential unit 117 finds the difference between the block to be coded sent from the delay unit 116 and the prediction value sent from the motion compensation unit 115, thereby outputting the difference to the quantization unit 118. The difference is called a prediction error because it is between the block to be coded and a block indicating the prediction value.

The quantization unit 118 DCT-converts the block indicating the prediction error and quantizes the DCT-converted block, thereby outputting it to the inverse quantization unit 119 and the variable length coding unit 11b.

The inverse quantization unit 119 inverse quantizes the quantized prediction error and inverse DCT-converts the inverse quantized prediction error, thereby outputting it to the addition unit 11a.

The addition unit 11a reproduces the block to be coded by adding an output of the inverse quantization unit 119 and the block (prediction value) extracted by the motion compensation unit 115, thereby outputting the reproduced block to the frame memory 114.

The VLC unit 11b applies a variable coding operation to the prediction error that has been quantized in the quantization unit 118.

The motion vector storing unit 11c sequentially receives motion vectors detected by the motion vector detection unit 113 and stores all the motion vectors of each block in the previous frame.

Figure 6:
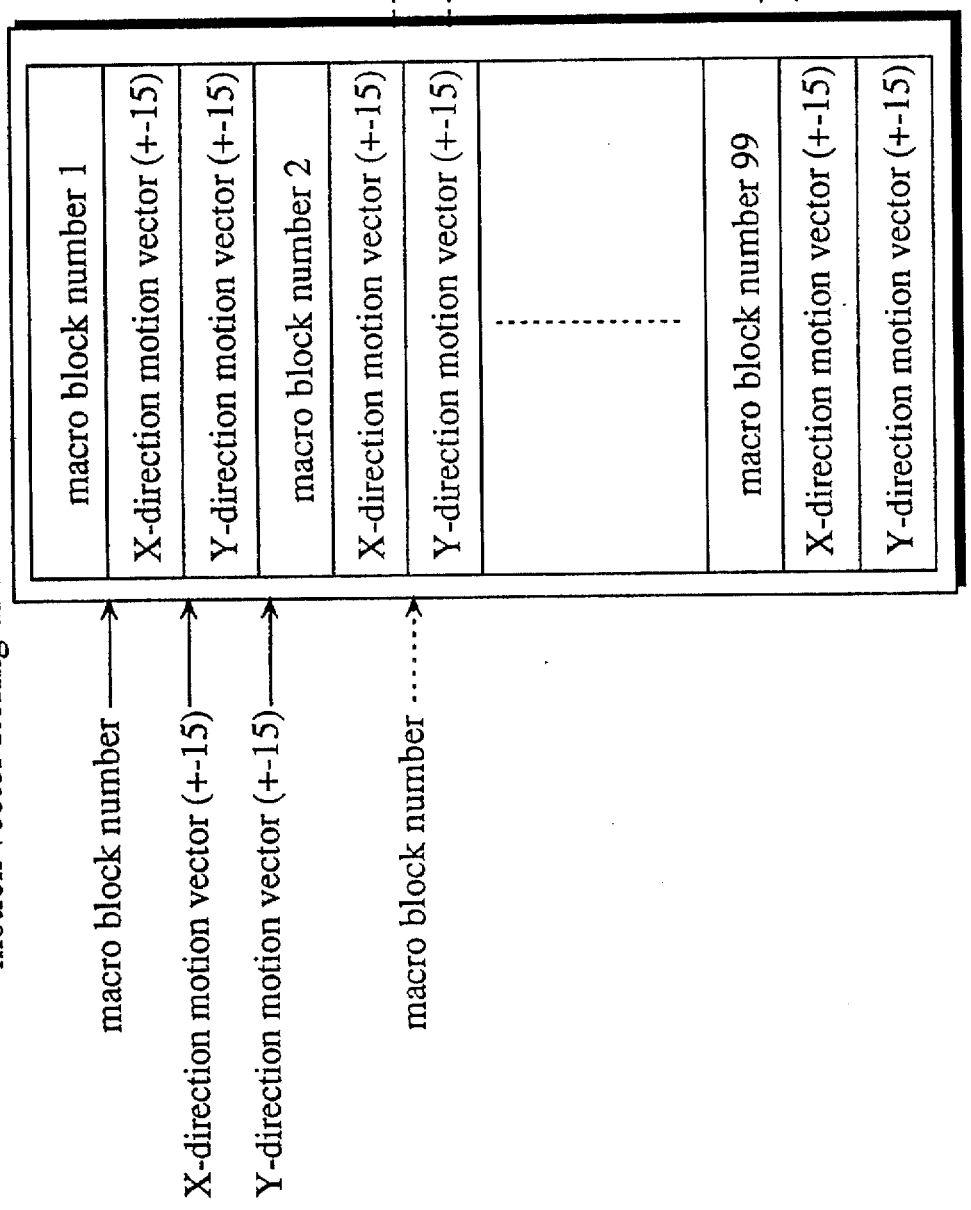
FIG. 6 shows an example of the contents stored in the motion vector storing unit 11c according to the first embodiment.

FIG. 6 shows an example of the contents stored in the motion vector storing unit 11c. In the drawing, information with the full line arrows indicates the identification number of the macro block having the motion vector, the motion vector in the X direction, the motion vector in the Y direction. The information is inputted from the motion vector detection unit 113 every time a motion vector has been detected. The information thus inputted is stored by corresponding the 99 motion vectors with each macro block identification number. The information with broken line arrows is inputted or outputted when motion vectors are read out from the motion vector VLC unit 11e. In other words, when a macro block identification number is inputted, the corresponding motion vector (X component and Y component) is outputted.

Figure 7:
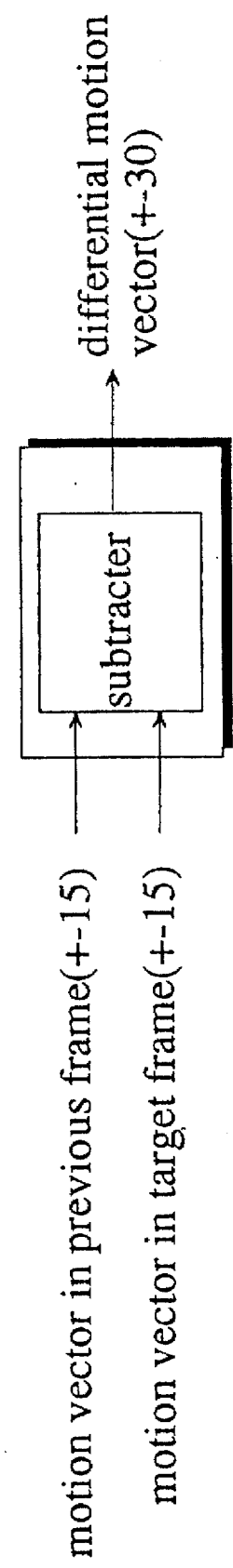
FIG. 7 shows the differential motion vector detection unit 11d provided with a subtracter according to the first embodiment.
Figure 9:
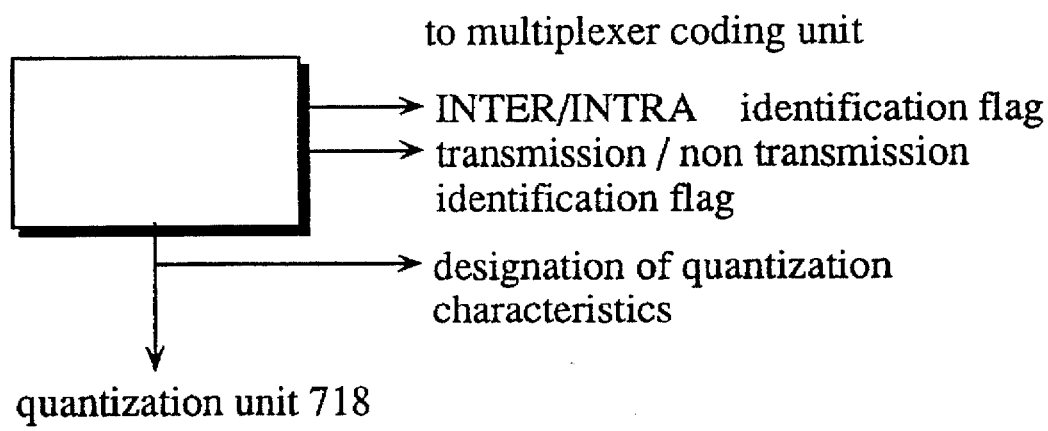
FIG. 9 shows an illustration to explain input/output signals of the coding control unit 11i according to the first embodiment.

The differential motion vector detection unit 11d finds the difference between the motion vector detected by the motion vector detection unit 113 and the motion vector of the corresponding block stored in the motion vector storing unit 11c, thereby outputting the difference thus found to the motion vector VLC unit 11e. To be more specific, as shown in FIG. 7, the differential motion vector detection unit 11d is provided with a subtracter.

The motion vector VLC unit 11e applies a variable coding operation to the differential motion vector detected by the differential motion vector detection unit 11d, thereby outputting it to the multiplexer coding unit 11f.

FIG. 8 shows a table of codes to be used by the motion vector VLC unit 11e. In the table, each value of the X components and Y components of differential motion vectors and a respective code are stored in association. An X component and a Y component are converted separately. For example, when a value of a component of a differential motion vector is −14 or 18, the codes become 0000 0011 101. Although a code is assigned to two different values, one of which is selected based on the value of a motion vector in the previous frame when it is decoded.

The multiplexer coding unit 11f multiplexes the prediction error which has been coded by the VLC unit 11b and the differential motion vector which has been coded by the differential motion vector detection unit 11d.

The transmission unit 11g outputs multiplexed codes through the code output terminal 11h.

The coding control unit 11i controls a coding process as well as outputs an INTER/INTRA identification flag and a transmission/non transmission identification flag to the multiplexer coding unit 11f. Furthermore, the coding control unit 11i assigns quantization characteristics to the multiplexer coding unit 11f and the quantization unit 118. The INTER/INTRA identification flag indicates whether the coding operation is carried out within a target frame (INTRA) or between a target frame and a frame preceding the target frame (INTER). The transmission/non transmission identification flag indicates whether a target frame should be transmitted or not. The quantization characteristics indicates quantization characteristics applied to the target frame by the quantization unit 718.

<1.2 Construction of Video Decoding Apparatus>

Figure 2:
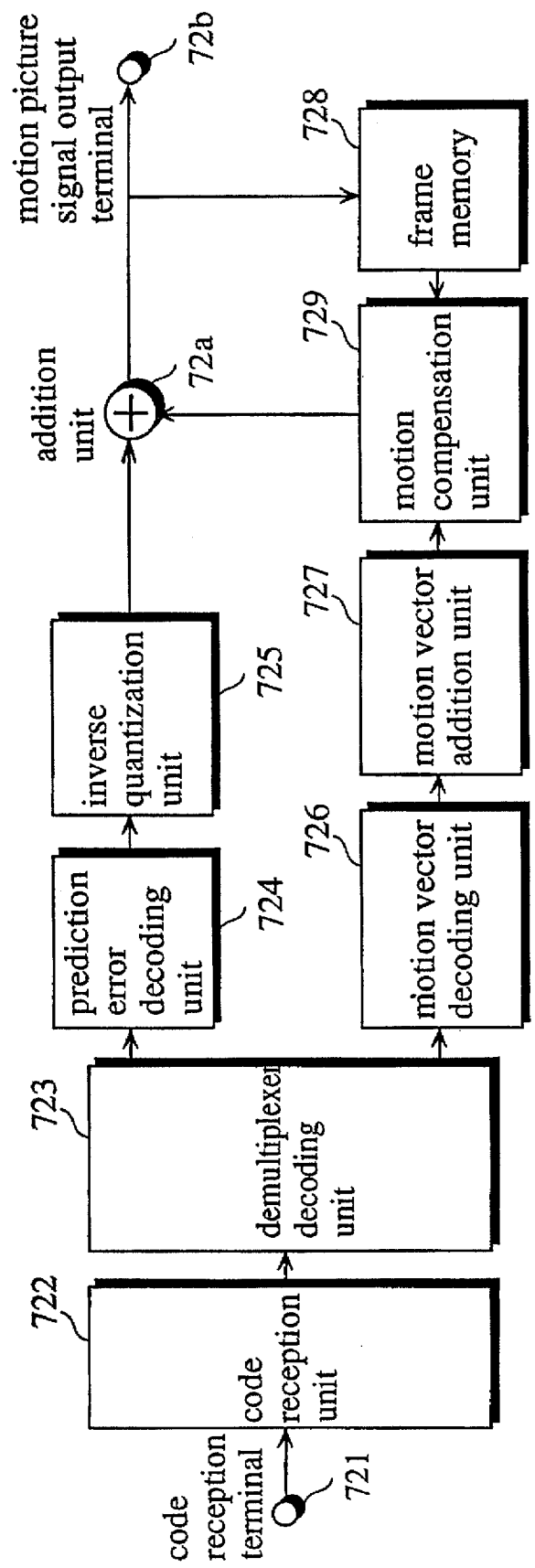
FIG. 2 shows the construction of a conventional video decoding apparatus.
Figure 10:
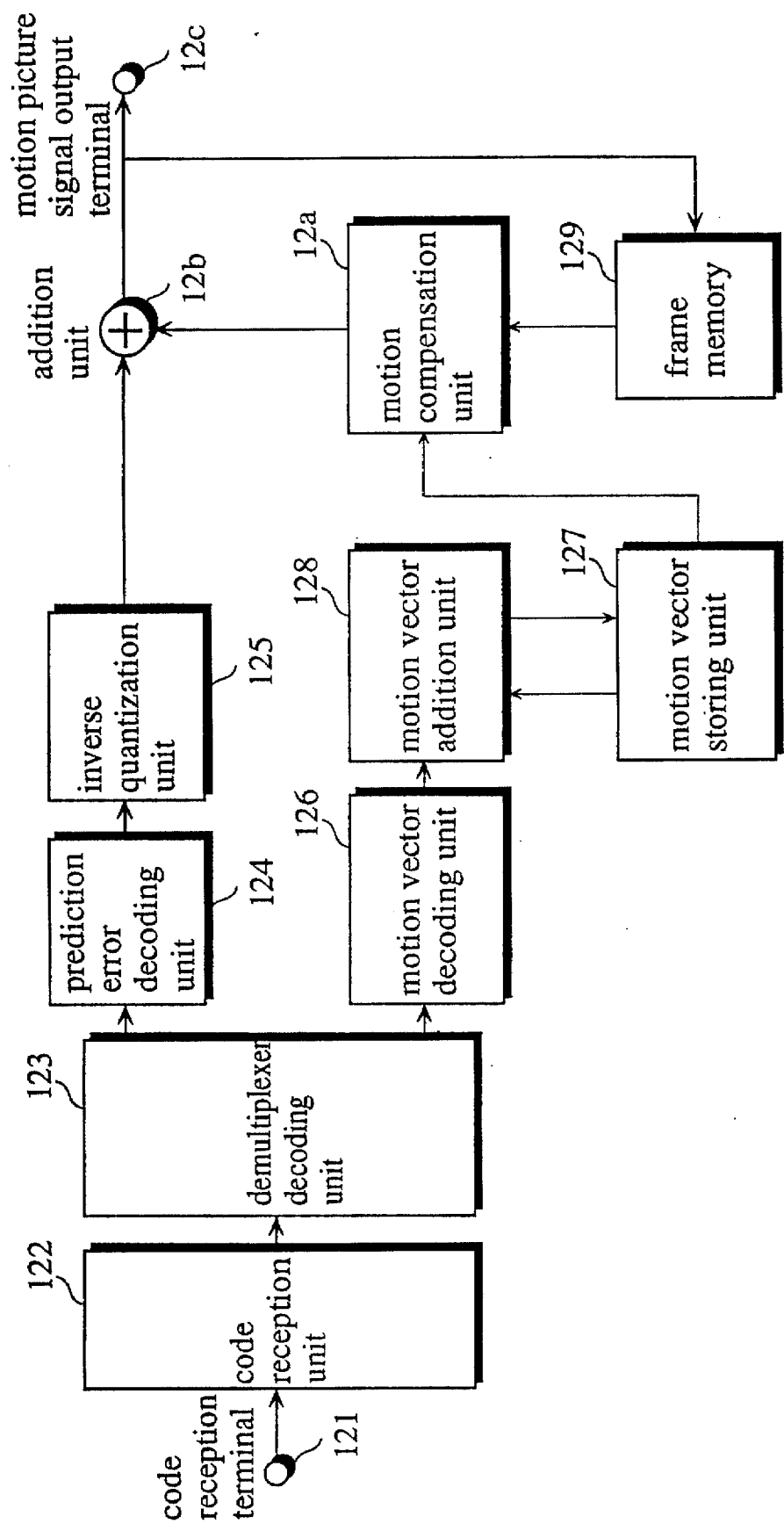
FIG. 10 shows the construction of the video decoding apparatus of the first embodiment.

FIG. 10 shows the construction of the video decoding apparatus of this embodiment. The apparatus includes a code reception terminal 121, a code reception unit 122, a prediction error decoding unit 124, an inverse quantization unit 125, a motion vector decoding unit 126, a motion vector storing unit 127, a motion vector addition unit 128, a frame memory 129, a motion compensation unit 12a, an addition unit 12b, and a motion picture signal output terminal 12c. Among these components, only the motion vector storing unit 127 and the frame memory 129 are different from their equivalents in FIG. 2 which shows the construction of the conventional video decoding apparatus.

In FIG. 10, motion picture signals which have been multiplexed and coded are inputted to the demultiplexer decoding unit 123 via the code reception unit 122.

The demultiplexer decoding unit 123 divides the motion picture signals into coded prediction errors and coded differential motion vector, thereby outputting the former to the prediction error decoding unit 124 and the latter to the motion vector decoding unit 126 both in block units.

The prediction error decoding unit 124 decodes coded prediction errors and then outputs them to the inverse quantization unit 125. The output indicates quantized prediction errors.

The inverse quantization unit 125 inverse quantizes the quantized prediction errors and then inverse DCT converts the inverse quantized prediction errors, thereby outputting them to the addition unit 12b.

The motion vector decoding unit 126 decodes coded differential motion vectors, thereby outputting them to the motion vector storing unit 127. The output indicates differential motion vector.

Figure 11:
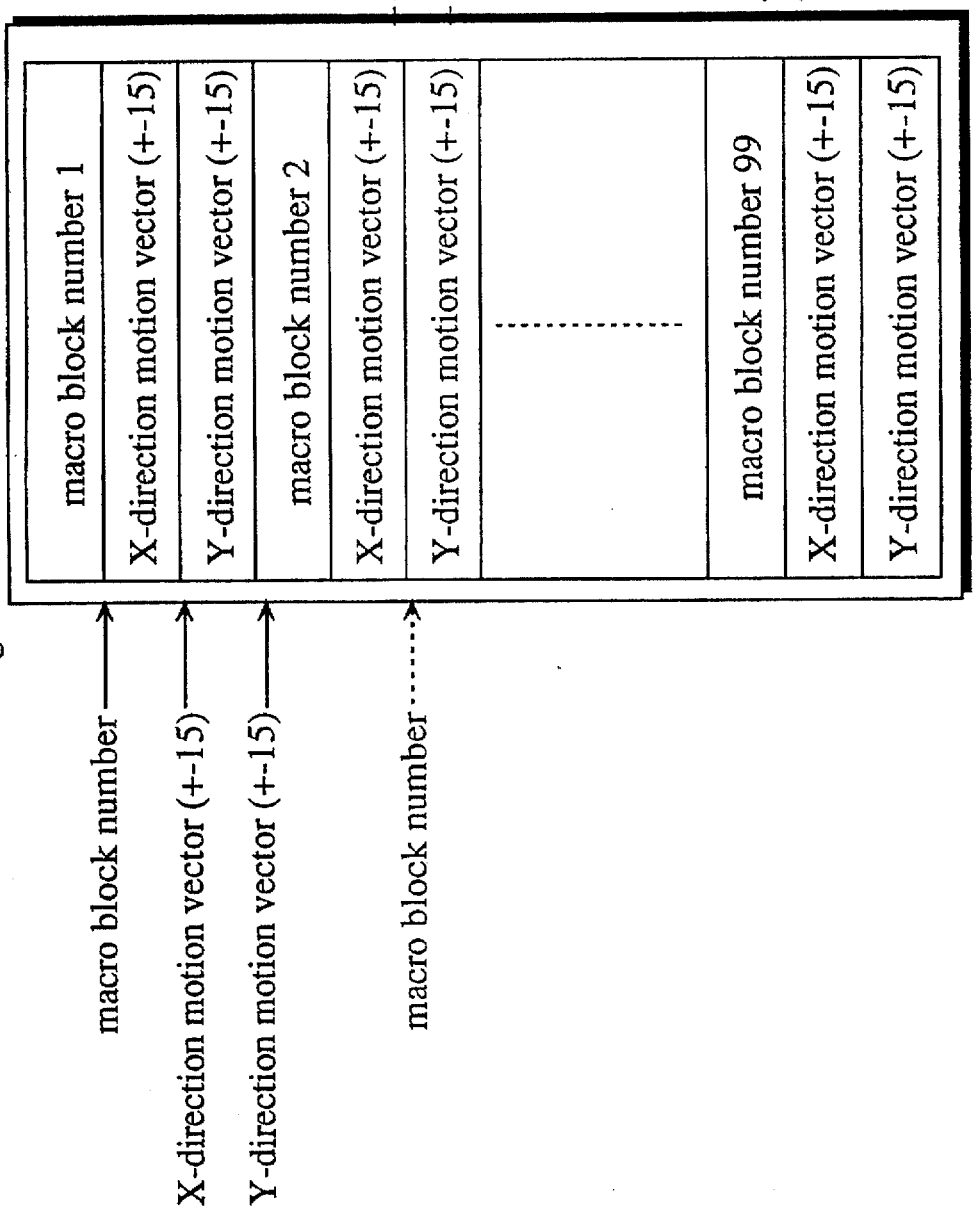
FIG. 11 shows an example of the contents stored in the motion vector storing unit 127 according to the first embodiment.

The motion vector storing unit 127 sequentially receives motion vectors detected by the motion vector addition unit 128 and stores all the motion vectors of each block in the previous frame. FIG. 11 shows an example of the contents stored in the motion vector storing unit 127. Since the contents are the same as those in FIG. 6, they are not explained again here.

Figure 12:
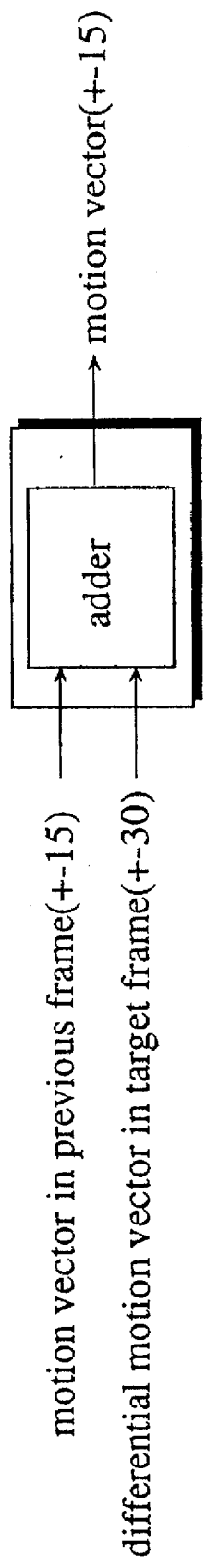
FIG. 12 shows an example of the construction of the motion vector addition unit 128 according to the first embodiment.

The motion vector addition unit 128 adds the differential motion vector sent from the motion vector decoding unit 126 and the motion vector of the block, which corresponds to the differential motion vector, in the previous frame stored in the motion vector storing unit 127. Then, the unit 128 outputs the obtained motion vector to the motion compensation unit 12a and the motion vector storing unit 127. To be more specific, as shown in FIG. 12, the motion vector addition unit 128 is provided with an adder.

The frame memory 129 which has an area for storing a reproduced frame, which has been in one cycle before and another area for sequentially storing each reproduced block inputted from the addition unit 12b.

The motion compensation unit 12a extracts a block indicating a prediction value from the frame stored in the frame memory 129, based on the received motion vector, thereby outputting the extracted block to the addition unit 12b.

The addition unit 12b adds the prediction error sent from the inverse quantization unit 125 and the prediction error sent from the motion compensation unit 12a, thereby outputting the result to the frame memory 129 and the motion picture signal output terminal 12c. The output of this addition indicates motion picture data reproduced in block units.

The following are operational descriptions of the video coding apparatus and the video decoding apparatus of this embodiment. Since the coding and decoding operations of the prediction errors in the video coding apparatus and the video decoding apparatus are equal to those in the conventional apparatus, the following description is limited to the operation concerning coding and decoding of motion vectors.

<1.3 Operation of Video Coding Apparatus>

Figure 13:
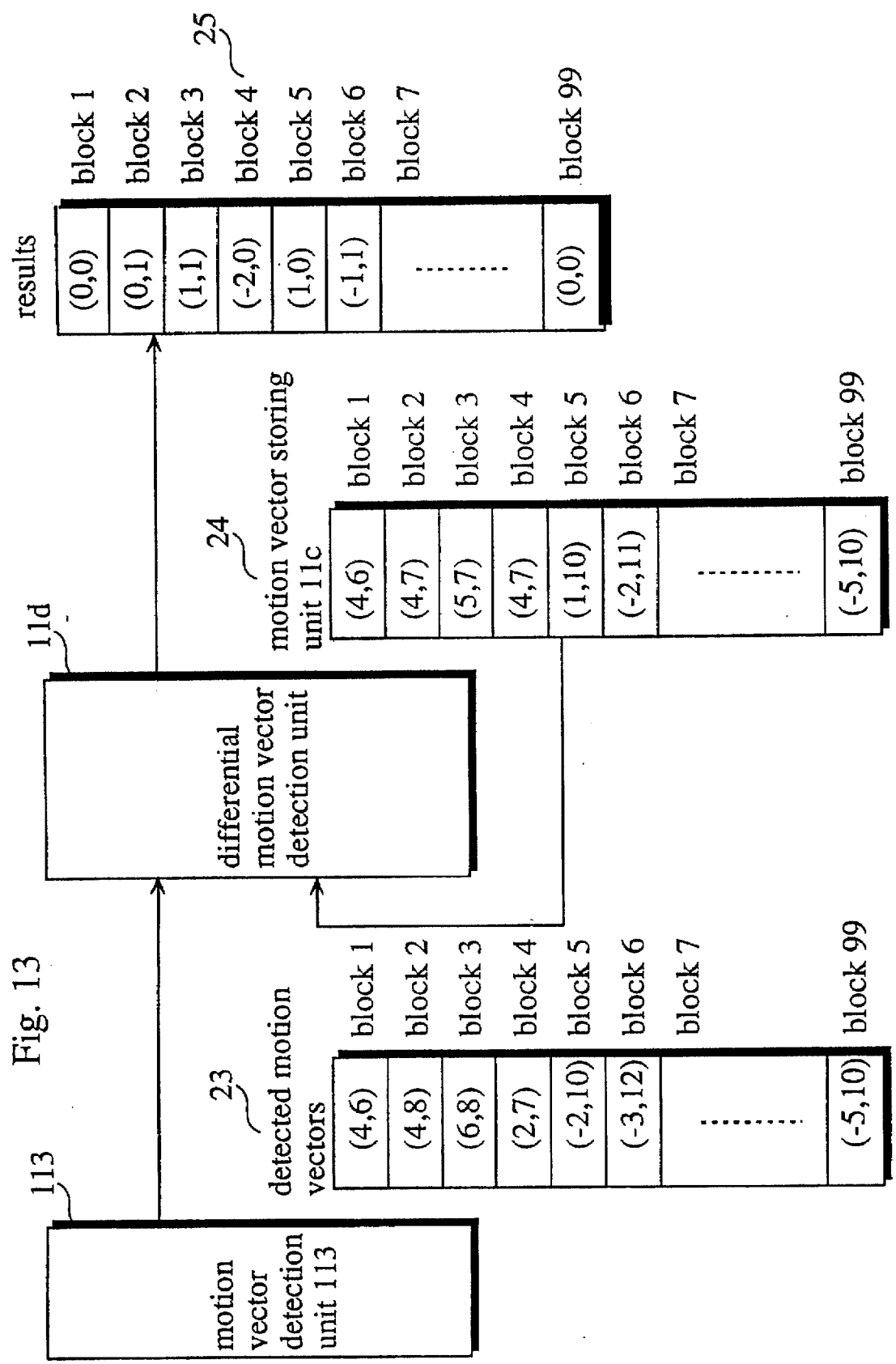
FIG. 13 shows coding operations according to the first embodiment.

FIG. 13 shows motion vectors detected by the motion vector detection unit 113, contents stored by the motion vector storing unit 11c, and detected results of the differential motion vector detection unit 11d.

The drawing shows a point of time in which the motion vector storing unit 11c has stored all the motion vectors during the process of the previous frame, and the motion vector 23 and the differential motion vector 25 of the target frame have not been detected yet. In other words, it is assumed that one frame has already been coded, and the reproduced motion picture data for the frame have been stored in the frame memory 114 and all the motion vectors of the frame have been stored in the motion vector storing unit 11c.

A motion picture signal inputted through the motion picture-signal reception terminal 111 is divided into several blocks by the conversion unit 112, and outputted to the motion vector detection unit 113 in block units.

Upon receiving the block 1, the motion vector detection unit 113 compares the previous frame stored in the frame memory 114 and the block 1, thereby finding the motion vector, which is (4, 6) shown in FIG. 13. The differential motion vector detection unit 11d finds the difference between the motion vector (4, 6) of the detected block 1 and the corresponding motion vector (4, 6) in the previous frame stored in the motion vector storing unit 11c, thereby outputting the obtained difference (0, 0) as a differential motion vector to the motion vector VLC unit 11e. The differential motion vector (0, 0) is coded by the motion vector VLC unit 11e, multiplexed by the multiplexer coding unit 11f, and then outputted from the code output terminal 11h.

Then, upon receiving the block 2, the motion vector detection unit 113 detects the motion vector (4, 8). The differential motion vector detection unit 11d finds the difference between the detected motion vector (4, 8) and the corresponding motion vector (4, 7) in the previous frame, thereby outputting the differential motion vector (0, 1). The motion vector (0, 1) is coded, multiplexed, and outputted through the code output terminal 11h.

The successive blocks are coded based on a differential motion vector between the detected motion vector and the corresponding motion vector in the previous frame.

<1.4 Operations of Video Decoding Apparatus>

In the video decoding apparatus shown in FIG. 10, it is assumed that the motion vector storing unit 127 has already stored all the motion vectors in the previous frame.

Coded motion picture data inputted through the code reception terminal 121 are sent to the demultiplexer decoding unit 123 through the code reception unit 122. The demultiplexer decoding unit 123 separates coded prediction error and the motion vector from each other, thereby outputting the coded prediction error to the prediction error decoding unit 124, and outputting the coded motion vector to the motion vector decoding unit 126. The motion vector decoding unit 126 decodes the coded differential motion vector and outputs it to the motion vector addition unit 128. The motion vector addition unit 128 adds the decoded differential motion vector with the motion vector of the corresponding block in the previous frame stored in the motion vector storing unit 127, thereby storing the motion vector in the frame which is currently being received to the motion vector storing unit 127. The motion compensation unit 12a extracts a prediction value from the frame memory 129 based on the motion vector of a block, which is currently being received, stored in the motion vector storing unit 127 in the same manner as the conventional apparatus. The prediction value and the decoded prediction error are added together, and as a result, motion picture data are reproduced.

As explained hereinbefore, according to the motion vector coding apparatus of this embodiment, the differential motion vector between the motion vector of the corresponding block in the previous frame and the motion vector of a block to be coded is found and coded by the differential motion vector detection unit 11d. Therefore, even if a transmission error occurs in a block, damage caused by the error is kept within the block, without spreading to adjacent blocks.

<Embodiment 2>

<2.1 Construction of Video Coding Apparatus>

Figure 14:
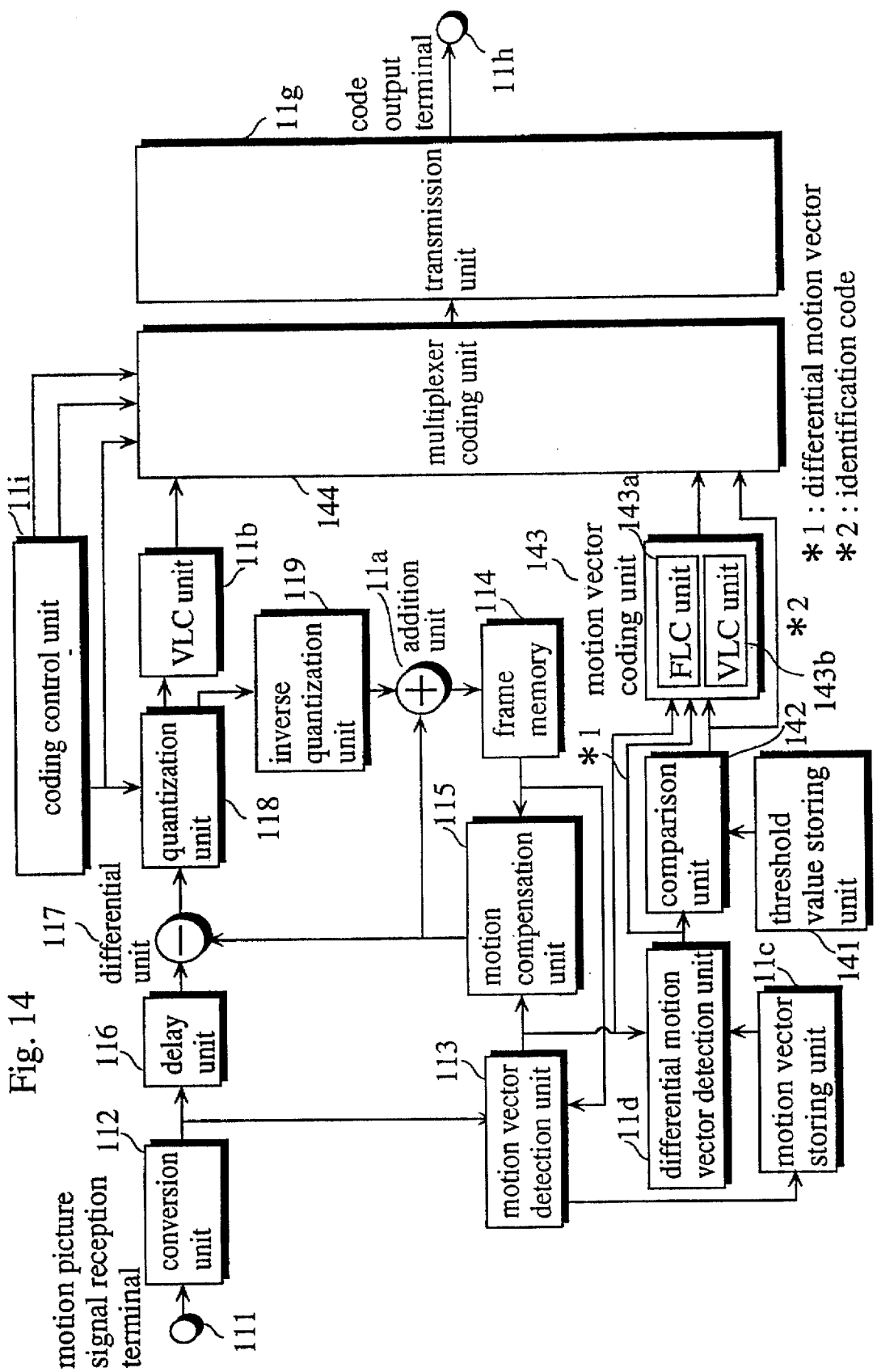
FIG. 14 shows the construction of the video coding apparatus of the second embodiment of the present invention.

FIG. 14 shows the construction of the video coding apparatus of this embodiment. The apparatus of this embodiment is equals to that in the first embodiment whose construction is shown in FIG. 3 except that the VLC unit 11e and the multiplexer coding unit 11f in the first embodiment are replaced by a variable length coding unit 143b (hereinafter VLC unit 143b) and a multiplexer coding unit 144, and that the following components are additionally provided: a threshold value storing unit 141, a comparison unit 142, a motion vector coding unit 143, and a fixed length coding unit 143a (hereinafter FLC unit 143a).

The threshold value storing unit 141 stores a predetermined threshold value for determining which is greater between the predetermined threshold and the differential motion vectors detected by the differential motion vector detection unit 11d. In this embodiment, the absolute value of the predetermined threshold value is 2.

Figure 15:
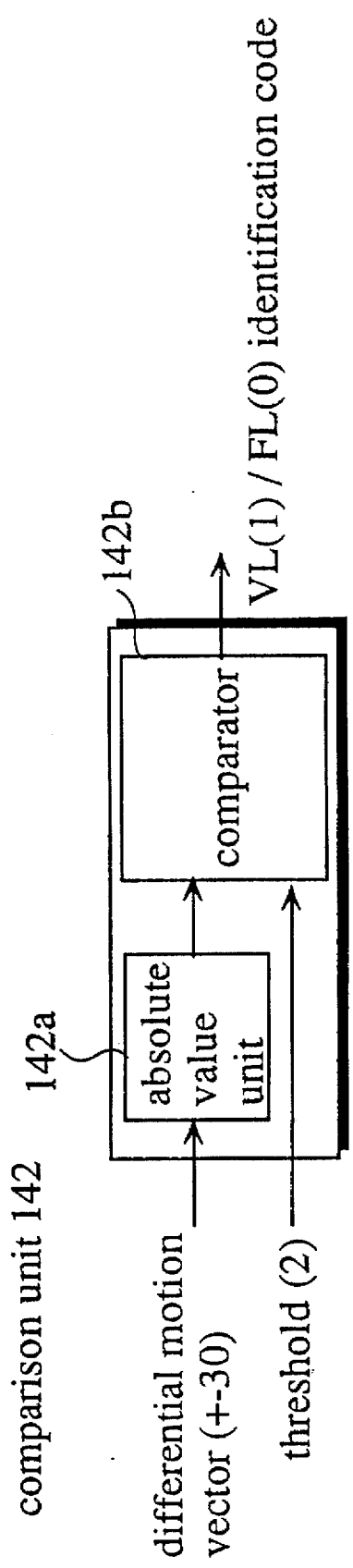
FIG. 15 shows a construction of the comparison unit 142 composed of an absolute value unit 142a and a comparator 142b according to the second embodiment.

The comparison unit 142 determines which is larger between the absolute values of the vertical/horizontal components of the differential motion vector stored in the differential motion vector detection unit 11d and the threshold value stored in the threshold value storing unit 141. FIG. 15 shows a construction of the comparison unit 142 composed of an absolute value unit 142a and a comparator 142b. The differential motion vector is inputted to the absolute value unit 142a to put each component into an absolute value. The comparator 142b compares the absolute value with the threshold value. The result obtained by the comparison is outputted to the motion vector coding unit 143 and the multiplexer coding unit 144 as a variable/fixed identification signal indicating which of a variable coding operation and a fixed coding operation should be carried out. In this embodiment, the variable/fixed identification signal becomes 0 when the absolute value of the components of the differential motion vector is greater than the threshold 2 (fixed length) and becomes 1 when it is 2 or smaller (variable length).

The motion vector coding unit 143, which has the FLC unit 143a and the VLC unit 143b, either fixed-length codes the motion vector sent from the motion vector detection unit 113 or variable-length codes the differential motion vector sent from the differential motion vector detection unit 11d, in accordance with the variable/fixed identification signal.

Figure 16:
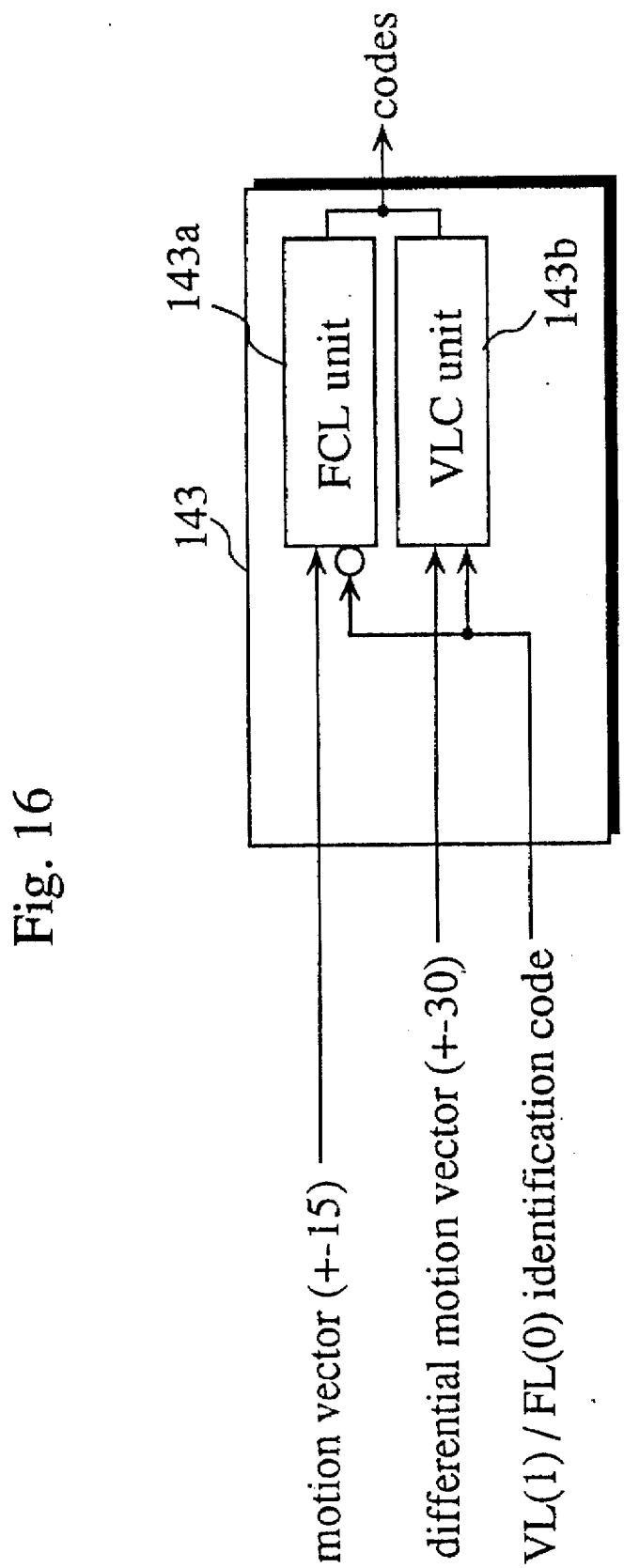
FIG. 16 shows a specific construction of the motion vector coding unit 143 according to the second embodiment.
Figures 17A, 17B:
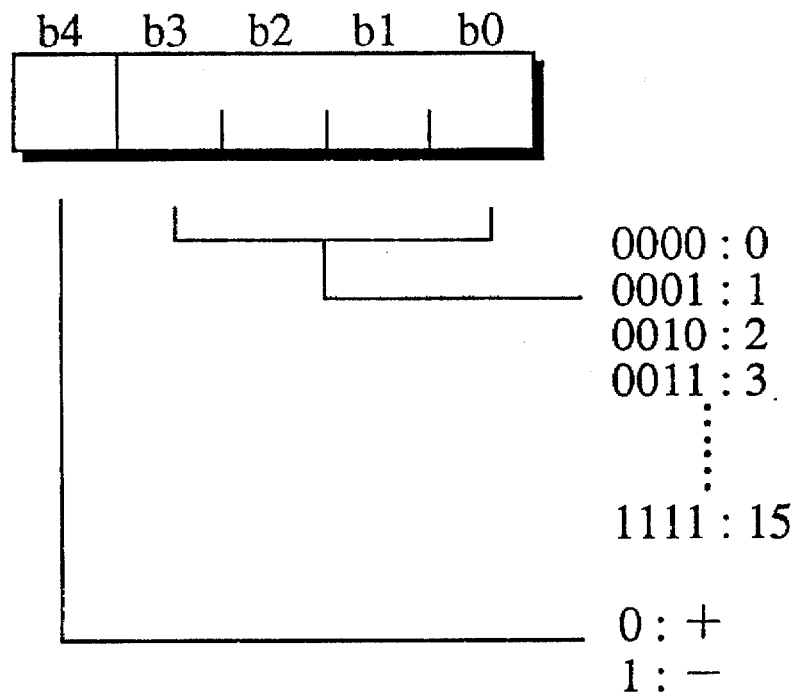
FIGS. 17A and 17B show coding operations of the FLC unit 143a and the VLC unit 143b respectively.

FIG. 16 shows a specific construction of the motion vector coding unit 143. FIGS. 17A and 17B show coding operations of the FLC unit 143a and the VLC unit 143b, respectively.

As shown in FIG. 17A, the FLC unit 143a puts the motion vector into a fixed 5-bit code (b4–b0). Since the area for retrieving motion vectors in the motion vector detection unit 113 is between −15 and +15, the motion vector can be represented by 5 bits.

As shown in FIG. 17B, the VLC unit 143b puts the absolute value of each component of the differential motion vector into codes having 1 to 4 bit variable length, if the absolute value is 2 or smaller.

The multiplexer coding unit 144 multiplexes the prediction error which have been put into a code by the VLC unit 11b, the output of the motion vector coding unit 143, and a fixed/variable identification signal sent from the comparison unit 142. The fixed/variable identification signal, when it is multiplexed, is included into type information (MTYPE) indicating the coding type of a macro block and the presence or absence of each data element. FIG. 18 is a table showing the MTYPE information including the fixed/variable identification signals and the codes. In the table, "predictions" indicate types of prediction coding, and "MQUANT", "MVD", "CBP", and "TCOEFF" indicate various data elements. Each circle indicates that the respective data element is included. The "codes" indicate TYPE information. It should be noted here that "MVD" which indicates the presence or absence of a motion vector tells whether the motion vector is put into a variable length code or a fixed length code. This information telling which of the two codes is selected is reported to the side of the decoding apparatus. Since the data other than "MVD" and "Predictions" are equal to those in the conventional apparatus (refer to the above-mentioned H. 261), they are not explained here.

<2.2 Construction of Video Decoding Apparatus>

Figure 19:
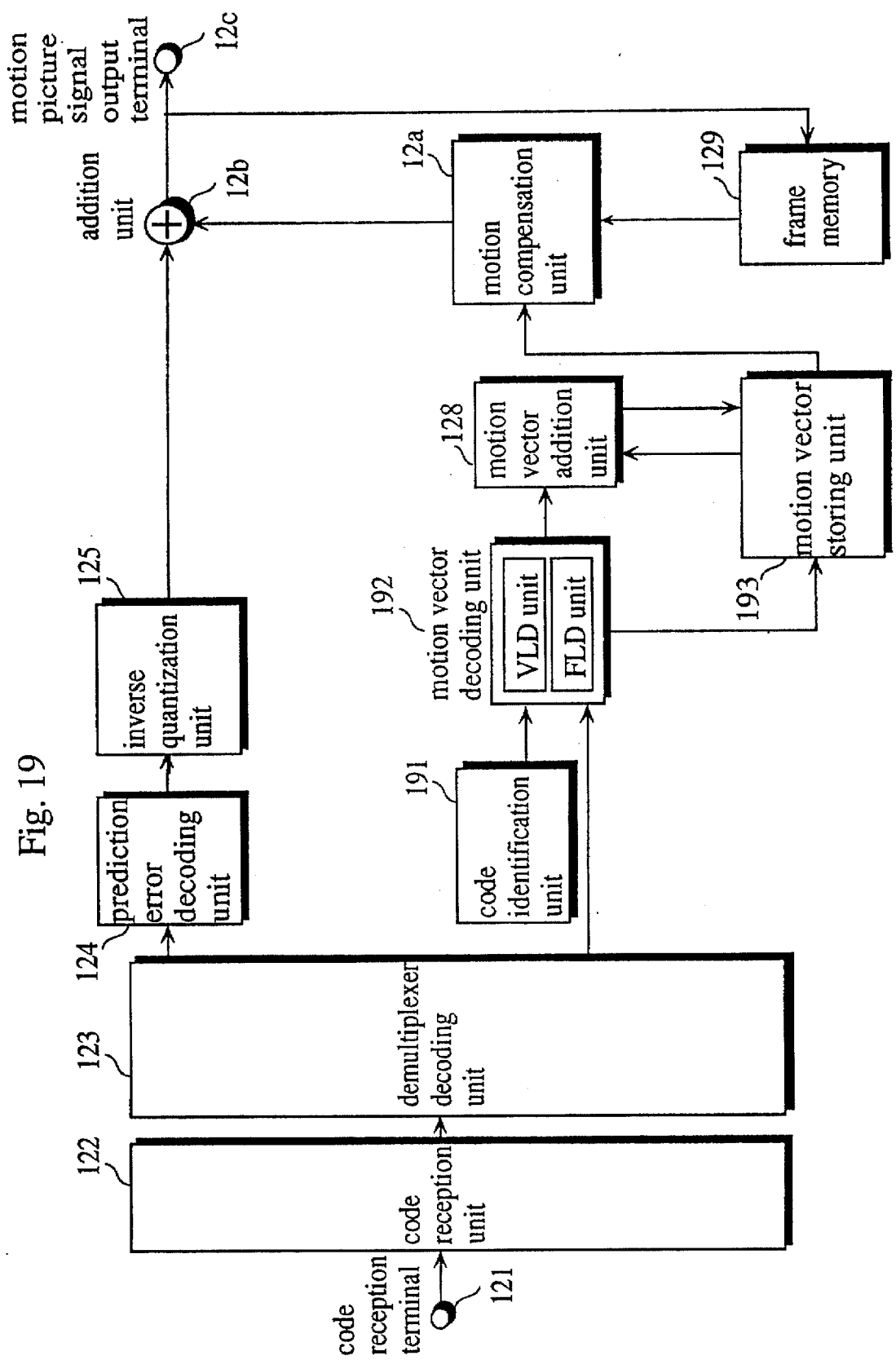
FIG. 19 shows the construction of the video decoding apparatus of the second embodiment.

FIG. 19 shows the construction of the video decoding apparatus of this embodiment. The apparatus of this embodiment is equal to that in the first embodiment whose construction is shown in FIG. 10 except that the motion vector decoding unit 126 and the motion vector storing unit 127 in the embodiment are replaced by a motion vector decoding unit 192 and a motion vector storing unit 193 and that a code identification unit 191 is additionally provided.

The code identification unit 191 decodes the MTYPE sent from the prediction error decoding unit 124 and extracts one data element (MVD) contained in the MTYPE, thereby outputting it as a variable/fixed identification signal to the motion vector decoding unit 192.

The motion vector decoding unit 192 fixed-length decodes the coded (differential) motion vector sent from the demultiplexer decoding unit 123, if the motion vector is a fixed length code, and on the other hand, variable-length decodes the motion vector when it is a variable length code.

Figure 20:
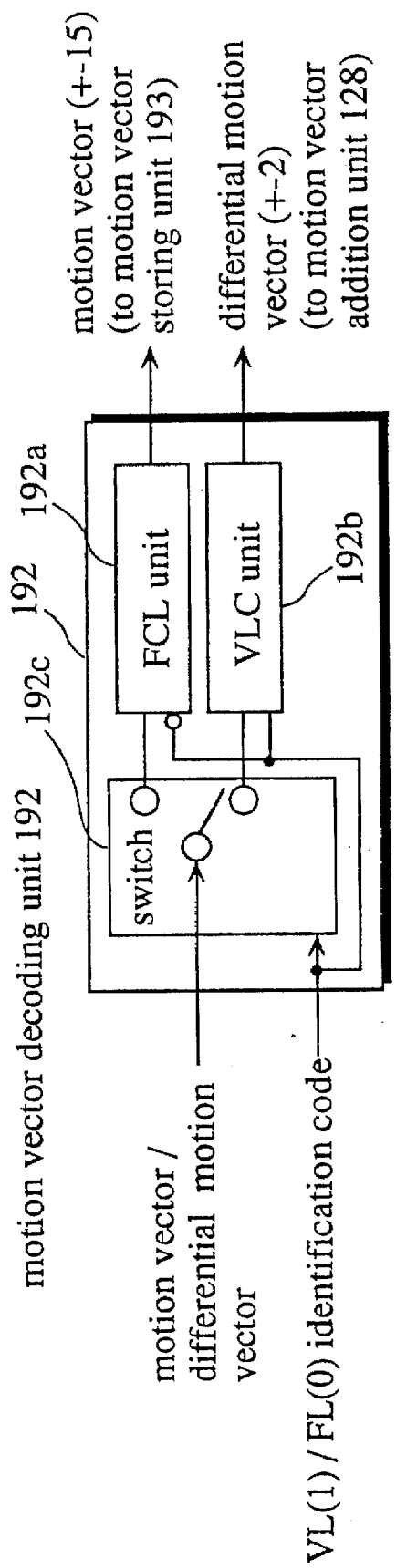
FIG. 20 shows a specific construction of the motion vector decoding unit 192 which is composed of a fixed decoding unit 192a and a variable length decoding unit 192b.
Figures 21A, 21B:
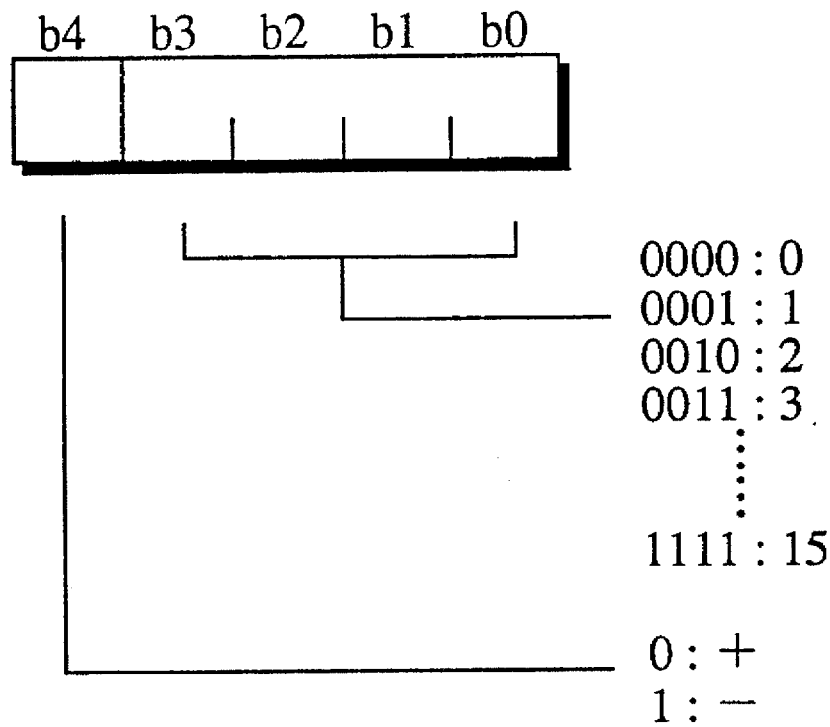
FIGS. 21A and 21B show coding operations of the FLC unit 192a and the VLC unit 192b respectively.

FIG. 20 shows a specific construction of the motion vector decoding unit 192 which is composed of a fixed decoding unit 192a (hereinafter FLD unit 192a) and a variable length decoding unit 192b (hereinafter VLD unit 192b). A switch 192c outputs a coded differential motion vector sent from the demultiplexer decoding unit 123 to the VLD unit 192b, if the variable/fixed identification signal sent from the code identification unit 191 is 0 (variable length). On the other hand, if the signal is 1 (fixed length), the switch 192c outputs the coded motion vector to the FLD unit 192a, activating one of the decoding units 192a or 192b connected. The FLD unit 192a fixed-length decodes each component of coded motion vectors, thereby outputting the result to the motion vector storing unit 193 as shown in FIG. 21A. The VLD unit 192b variable-length decodes each component of coded differential motion vectors, thereby outputting the result to the motion vector addition unit 128 as shown in FIG. 21B.

The motion vector storing unit 193 stores the motion vector sent from the motion vector addition unit 128 and the motion vector sent from the FLD unit 192a. This motion vector storing unit 193 is only different from the motion vector storing unit 127 in the first embodiment in that motion vectors are inputted also from the FLD unit 192a.

The following are operational descriptions of the video coding apparatus and the video decoding apparatus of this embodiment. The descriptions are focused on the coding and decoding operations of motion vectors, which have been more improved than in the first embodiment.

<2.3 Operation of Video Coding Apparatus>

The differential motion vector detection unit 11d finds the difference between the motion vector detected by the motion vector detection unit 113 and the motion vector of the corresponding block in the previous frame. The operation so far is equal to that in the first embodiment; however, the subsequent operations are not.

The absolute value of the differential motion vector is compared with the threshold value 2 by the comparison unit 142. If the absolute value is 2 or smaller, the VLD unit 192b applies a variable length coding operation to the differential motion vector, not to the motion vector. As a result, the coded differential motion vector is put into a code of 4 bits or smaller shown in FIG. 21B. On the other hand, if the absolute value is greater than the threshold value, the FLD unit 192a applies a fixed length coding operation to the motion vector, not to the differential motion vector. As a result, the coded motion vector is put into a 5-bit code.

The motion vector or the differential motion vector thus coded are multiplexed with the variable/fixed identification signal sent from the comparison unit 142 and the prediction error sent from the VLC unit 11b by the multiplexer coding unit 144, thereby being transmitted.

As explained hereinbefore, according to the video coding apparatus of this embodiment, the result obtained from a coding operation by the motion vector coding unit 143 is inevitably 5 bits or smaller. Thus, compared with the first embodiment where the maximum code is 11 bits as shown in FIG. 8, the coding efficiency has been improved.

<2.4 Operation of Video Decoding Apparatus>

Either the coded motion vector or the coded differential motion vector which are separated from each other by the demultiplexer decoding unit 123 is inputted to the motion vector decoding unit 192. At this time, the variable/fixed identification signal extracted from the MTYPE information by the code identification unit 191 is also inputted. The variable/fixed identification signal indicates whether the coded (differential) motion vector inputted to the motion vector decoding unit 192 is a fixed length code (0) or a variable length code (1). Accordingly, the motion vector decoding unit 192 selects between a fixed length decoding and a variable length decoding. To be specific, the identification signal connects the switch 192c shown in FIG. 20 with a corresponding decoding unit, thereby activating it.

As a result, the motion vector which has been fixed-length decoded in the video coding apparatus of this embodiment is fixed-length decoded by the FLD unit 192a whereas the differential motion vector which has been variable-length decoded is variable-length decoded by the VLD unit 192b. The result obtained by a fixed decoding operation of the FLD unit 192a is stored to the motion vector storing unit 193 because the result indicates a motion vector, thereby outputting to the motion compensation unit 12a. The result obtained by a variable length decoding operation of the VLD unit 192b is outputted to the motion vector addition unit 128 because the result indicates a differential motion vector.

<Embodiment 3>

<3:1 Construction of Video Coding Apparatus>

The video coding apparatus of this embodiment is the same as the corresponding apparatus of the second embodiment except that a motion vector coding unit 260, which corresponds to the motion vector coding unit 143 in the second embodiment, is provided with a parity generation unit 143c as shown in FIG. 26.

The parity generation unit 143c adds an odd number of parity bit to a code which has been sent from the FLC unit 143a and the VLC unit 143b, thereby outputting the result to the multiplexer coding unit 144. FIGS. 27A and 27B show codes which have been generated by the FLC unit 143a and VLC unit 143b respectively. As apparent from these drawings, a parity bit is attached to the end of every code with the fixed length and the variable length. As a result, every code has an odd number of logical one bit.

<3.2 Construction of Video Decoding Apparatus>

Figure 22:
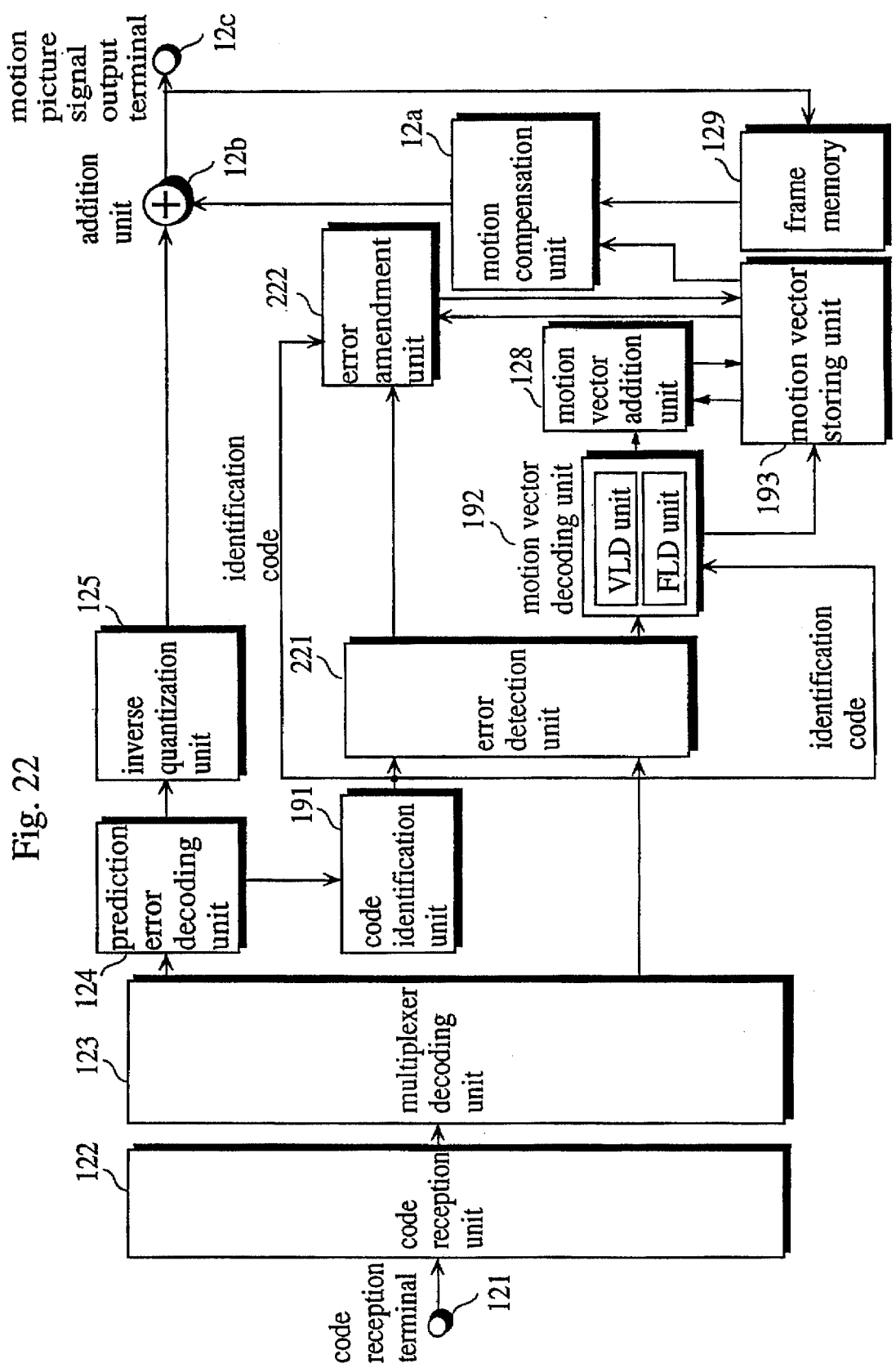
FIG. 22 shows the construction of the video decoding apparatus of the third embodiment of the present invention.

FIG. 22 shows the construction of the video decoding apparatus of this embodiment. The apparatus of this embodiment is equals to that in the second embodiment whose construction is shown in FIG. 19 except that an error detection unit 221 and an error amendment unit 222 are additionally provided.

Figure 23:
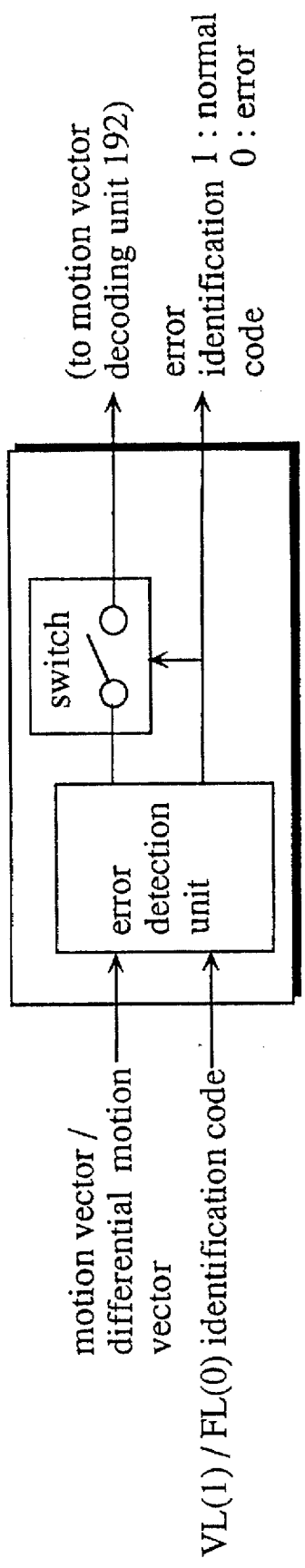
FIG. 23 shows a specific construction of the error detection unit 221 composed of an error detection circuit and a switch.

The error detection unit 221 detects whether an error has occurred in the coded (differential) motion vector which has been separated from the coded motion picture data in the demultiplexer decoding unit 123. If no error occurrence has been detected, the coded (differential) motion vector sent from the demultiplexer decoding unit 123 is outputted to the motion vector decoding unit 192. On the other hand, if an error occurrence has been detected, an error signal indicating that the presence of the error has been detected is outputted to the motion vector decoding unit 192 and the error amendment unit 222. As a result, the coded (differential) motion vector is prevented from being outputted to the motion vector decoding unit 192. FIG. 23 shows a specific construction of the error detection unit 221 composed of an error detection circuit and a switch. The error detection circuit checks parity for a coded (differential) motion vector and outputs an error signal when a parity error has occurred. The switch interrupts the coded (differential) motion vector to be sent for the motion vector decoding unit 192, when the occurrence of a parity error has been detected.

Figure 24:
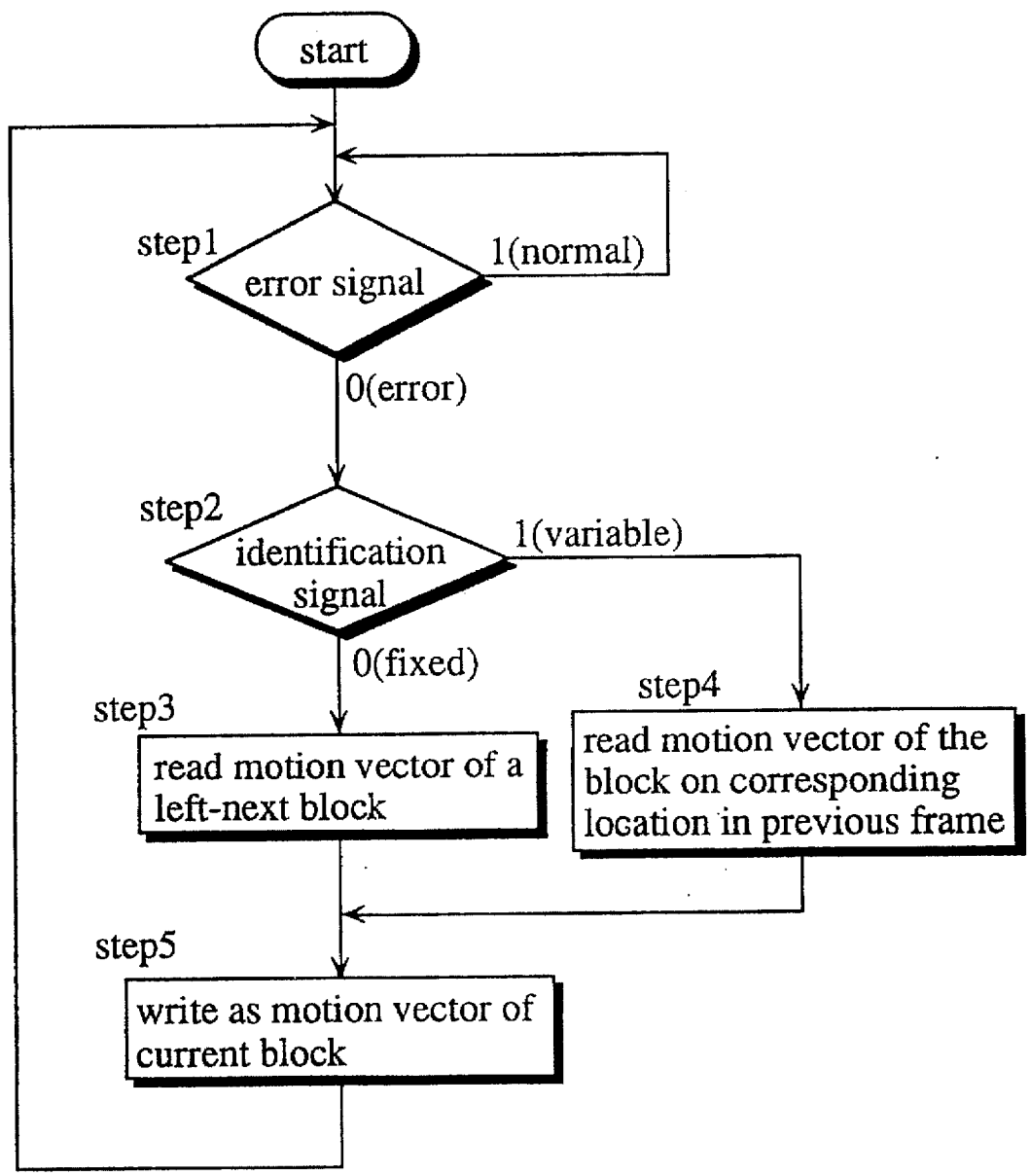
FIG. 24 shows a flowchart depicting an error amendment operation of the error amendment unit 222.

The error amendment unit 222 amends a motion vector when the presence of an error has been detected by the error detection unit 221. FIG. 24 shows a flowchart depicting an error amendment operation of the error amendment unit 222. When the error signal sent from the error detection unit 221 indicates 0 (Step 1:0), and if the identification signal sent from the code identification unit 191 is 0 or fixed (Step 2:0), the error amendment unit 222 reads out the motion vector of the previous block stored in the motion vector storing unit 193 (Step 3). The error amendment unit 222 then stores the read motion vector to the motion vector storing unit 193 as the motion vector of the current block (Step 5). On the other hand, if the identification signal is 1 or variable (Step 1:0, Step 2:1), the error amendment unit 222 reads out from the motion vector storing unit 193 the motion vector of the corresponding block in the previous frame (Step 4), thereby storing the read motion vector as the motion vector of the current block (Step 5).

<3.3 Operation of Video Decoding Apparatus>

The operation of the video decoding apparatus of this embodiment will be described with reference to FIGS. 25A and 25B.

When no error occurrence has been detected (error signal=1), the error detection unit 221 outputs the (differential) motion vector coded by the demultiplexer decoding unit 123 and the variable/fixed identification signal sent from the code identification unit 191 to the motion vector decoding unit 192. The other operations are equal to those in the second embodiment.

In contrast, when an error occurrence has been detected (error signal=0), the error amendment unit 222 carries out an amendment operation as follows.

When an error has occurred in the hatched block shown in FIG. 25A during a fixed length coding operation (identification signal=0), the error amendment unit 222 reads out from the motion vector storing unit 193 a value of the motion vector of the block which is located in the left of the hatched block, thereby storing it as the motion vector of the block which has suffered from the error to the motion vector storing unit 193 (Steps 1, 2, 3, and 5 in FIG. 24). The motion vector of the block in the left to the hatched block is selected as the amended motion vector because adjacent motion vectors in the same frame have a close correlation. (in a fixed length coding operation, motion vector itself is coded)

On the other hand, when an error has occurred in the hatched block shown in FIG. 25B during a variable length coding operation (identification signal=1), the error amendment unit 222 reads out from the motion vector storing unit 193 a value of the motion vector of the corresponding block in the previous frame, thereby storing it as the motion vector of the block which has suffered from the error to the motion vector storing unit 193 (Steps 1, 2, 4, and 5 in FIG. 24). The motion vector of the block in the previous frame is selected as the amended motion vector because each frame has a close correlation in a variable length coding operation. This is because a differential motion vector is coded only when the threshold is 2 or smaller, so that the amended motion vector has an error range of at most two pixels.

Hereinafter the motion compensation unit 12a and the addition unit 12b operate in the same manner as in the second embodiment, based on the obtained motion vector, thereby reproducing motion picture data.

As described hereinbefore, according to this embodiment, when an error has occurred in a motion vector, the error amendment unit 222 properly amends the motion vector in accordance with the type of the coding. As a result, image deterioration can be minimized. Especially when there is a close correlation among frames, the deterioration is almost prevented thanks to the accuracy of the amendment.

Although when an error has occurred in a fixed length coding operation, the error amendment unit 222 uses the block which is in the left of the block which suffers from the error as the amended motion vector in this embodiment, the average between motion vectors of the left block and the upper block may be used instead.

In addition, when an error has occurred in a variable length coding operation, the error amendment unit 222 uses the motion vector of the block in the previous frame as the amended motion vector in this embodiment; however, the average between motion vectors of the left block and the upper block, or among motion vectors of blocks in every direction in the previous frame may be used instead. This is because they have a close correlation with the motion vector having the error.

Furthermore, in a video decoding apparatus in which error compensation is carried out when motion pictures in all the blocks in a frame have been decoded, the average among motion vectors of blocks in every direction of a block whose motion vector having an error may be used if the motion vector having the error has been coded by the fixed length coding. On the other hand, if a block whose differential motion vector has been coded by the variable length coding has an error, the motion vector of the corresponding block in the previous frame, the average among motion vectors of blocks in every direction of the corresponding block, or one of the blocks in every direction may be used instead.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A motion picture decoding apparatus for decoding a coded prediction error for each block between a target frame and a reference frame, said target frame being a frame to be decoded and said reference frame being a frame that precedes said target frame, and for further decoding a coded motion vector and a coded differential motion vector between each block in the target frame and a corresponding block in the reference frame, said motion picture decoding apparatus comprising:

a code distinction means for distinguishing a fixed length coded motion vector from a variable length coded differential motion vector, based on a code distinction information sent from a motion picture coding apparatus;

a fixed length decoding means for decoding a motion vector which has been coded with a fixed length code, thereby outputting a motion vector;

a variable length decoding means for decoding a differential motion vector which has been coded with a variable length code, thereby outputting a differential motion vector;

a motion vector storage means for storing motion vectors of all blocks in the reference frame; and a motion vector addition means for adding the differential motion vector outputted from said variable length decoding means and motion vectors of corresponding blocks in the reference frame, wherein the motion vector outputted from said fixed length decoding means and the motion vector obtained by said motion vector addition means are used for decoding the prediction error.

2. The motion picture decoding apparatus of claim 1, wherein said motion vector storage means has a first area for sequentially storing motion vectors for a first frame sent from said fixed length coding means and said motion vector addition means, and a second area for sequentially storing detected motion vectors for a second frame which follows the first frame, whereby one of the first area and the second area always holds motion vectors of all blocks in a reference frame.

3. The motion picture decoding apparatus of claim 2, wherein said fixed length decoding means decodes each component of said coded motion vector, and said variable length decoding means decodes each component for said coded differential motion vector.

4. The motion picture decoding means of claim 1, further comprising:

an error detection means for detecting a presence of an error in one of a coded differential motion vector and a coded motion vector;

a prevention means for preventing said motion vector storage means and said motion vector addition means from processing a differential motion vector, when the differential motion vector has been detected to have an error; and an amendment means for, when a presence of an error has been detected, storing to said motion vector storage means a motion vector of a predetermined block instead of a motion vector having the error, said predetermined block being stored in said motion vector storage means.

5. The motion picture decoding apparatus of claim 4, wherein said predetermined block is one of a block which is adjacent to the block whose motion vector has the error and a block which is located in a same position in the reference frame as the block whose motion vector has the error.

6. The motion picture decoding apparatus of claim 5, wherein said predetermined block is a block which is adjacent to the block whose motion vector having the error, when said code distinction means indicates a fixed length code, and is a block which is located in a same position in the reference frame as the block whose motion vector has the error, when said code distinction means indicates a variable length code.

7. The motion picture decoding apparatus of claim 6, wherein said motion vector storage means has a first area for sequentially storing motion vectors for a first frame sent from said fixed length coding means and said motion vector addition means, and a second area for sequentially storing detected motion vectors for a second frame which follows the first frame, whereby one of the first area and the second area always holds motion vectors of all blocks in a reference frame.

8. The motion picture decoding apparatus of claim 7, wherein said fixed length decoding means decodes each component of said coded motion vector, and said variable length decoding means decodes each component for said coded differential motion vector.

9. A motion picture decoding method for decoding a coded prediction error for each block between a target frame and a reference frame, said target frame being a frame to be decoded and said reference frame being a frame that precedes said target frame, and for further decoding a coded differential motion vector and a coded motion vector between each block in the target frame and a corresponding block in the reference frame, said motion picture decoding method comprising the steps of:

distinguishing a fixed length coded motion vector from a variable length coded differential motion vector, based on a code distinction information contained in a coded motion picture;

decoding a motion vector which has been coded with a fixed length code, thereby outputting a motion vector;

decoding a differential motion vector which has been coded with a variable length code, thereby outputting a differential motion vector;

storing motion vectors of all blocks in the reference frame to a memory; and adding the differential motion vector outputted in the first decoding step and motion vectors of corresponding blocks in the reference frame, wherein the motion vector outputted in the first decoding step and the motion vector obtained from the adding step are used for decoding the prediction error.

10. The motion picture decoding method of claim 9, wherein the motion vector storing step includes an operation of sequentially storing motion vectors for a first frame, which have been obtained in the fixed length decoding step and said motion vector addition step to a first area of the memory and another operation of sequentially storing detected motion vectors for a second frame which follows the first frame to a second area of the memory, whereby one of the first area and the second area of the memory always holds motion vectors of all blocks in a reference frame.

11. The motion picture decoding method of claim 10, wherein the fixed length decoding step fixed length decodes each component of said motion vector, and the variable length decoding step variable length decodes each component for said differential motion vector.

12. The motion picture decoding method of claim 9 further comprising the steps of:

detecting a presence of an error in one of a coded differential motion vector and a coded motion vector;

preventing the motion vector storing step and the motion vector adding step from processing a differential motion vector, when the differential motion vector has been detected to have an error; and when a presence of an error has been detected, amending a motion vector having the error by storing a motion vector of a predetermined block to said motion vector storing step.

13. The motion picture decoding method of claim 12, wherein said predetermined block is one of a block which is adjacent to the block whose motion vector has the error and a block which is located in a same position in the reference frame as the block whose motion vector has the error.

14. The motion picture decoding method of claim 13, wherein said predetermined block is a block which is adjacent to the block whose motion vector having the error, when said code distinguishing step indicates a fixed length code, and is a block which is located in a same position in the reference frame as the block whose motion vector having the error, when said code distinction step indicates a variable length code.

15. The motion picture decoding method of claim 14, wherein the motion vector storing step includes an operation of sequentially storing motion vectors for a first frame, which have been obtained in the fixed length decoding step and said motion vector addition step to a first area of the memory and another operation of sequentially storing detected motion vectors for a second frame which follows the first frame to a second area of the memory, whereby one of the first area and the second area of the memory always holds motion vectors of all blocks in a reference frame.

16. The motion picture decoding method of claim 15, wherein the fixed length decoding step fixed length decodes each component of said motion vector, and the variable length decoding step variable length decodes each component for said differential motion vector.

17. A motion picture coding and decoding system for coding and decoding frames of video information relative to predetermined blocks of a target frame and a reference frame, comprising:

means for providing a motion vector for each block on the target frame based upon the reference frame;

first storage means for storing motion vectors of all blocks in the reference frame and target frame;

prediction error coding means for coding a difference between a target block having a motion vector and a corresponding block in the reference frame, the difference being a coded prediction error;

a differential motion vector detection means for detecting a differential motion vector between the target frame block and the reference frame block;

a differential motion vector coding means for coding the differential motion vector detected, including a variable length coding unit, a fixed length coding unit, a threshold value storing unit, and a comparison unit for comparing the threshold value stored with a representative value of the differential motion vector and depending on the comparison using one of the fixed length coding unit and the variable length coding unit to code the differential motion vector;

means for transmitting the coded differential motion vector with a coded prediction error;

means for receiving the coded differential motion vector with the coded prediction error;

error detection means for detecting a presence of an error in a coded differential motion vector;

means for decoding the coded differential motion vector, including a variable length decoding unit and a fixed length decoding unit;

second storage means for storing motion vectors of all blocks in the target frame and the reference frame;

motion vector addition means for adding the differential motion vector obtained by said differential motion vector decoding means and a motion vector of a corresponding block in the reference frame, thereby obtaining a motion vector to be used for decoding the prediction error;

means for decoding the coded prediction error;

prevention means for preventing said motion vector storage means and the motion vector addition means from processing a differential motion vector, when the differential motion vector has been detected to have an error;

amendment means for, when a presence of an error has been detected, storing to the second storage means a motion vector of a predetermined block instead of a motion vector having the error, the predetermined block being stored in the second storage means;

means for providing a prediction value based on the stored predetermined block; and means for adding the prediction value and the prediction error to provide a motion picture signal output.

18. The motion picture coding and decoding system of claim 17, wherein the predetermined block is one of a block which is adjacent to the block whose motion vector has the error and a block which is located in the same position in the reference frame as the block whose motion vector has the error.

19. A motion picture coding apparatus for dividing each frame which forms a motion picture into a plurality of blocks, for coding a prediction error in each of the blocks between a target frame and a reference frame, said target frame being a frame to be coded and said reference frame being a frame that precedes said target frame, and for further coding a motion vector to be used for obtaining the prediction error, said motion picture coding apparatus comprising:

a motion vector detection means for detecting a motion vector of each block in said reference frame and for detecting a motion vector of each block in said target frame;

a motion vector storage means for storing motion vectors of all blocks in the reference frame and for storing motion vectors of all blocks in the target frame, wherein said motion vector storage means has a first area for sequentially storing detected motion vectors for a first frame and a second area for sequentially storing detected motion vectors for a second frame which follows the first frame, whereby one of the first area and the second area always holds motion vectors of all blocks in a reference frame;

a differential motion vector detecting means for detecting a differential motion vector between a motion vector of the target frame and a motion vector of a corresponding block in the reference frame; and a coding means for coding a differential motion vector when a differential motion vector is equal or smaller than a predetermined threshold and for coding a motion vector when the differential motion vector is greater than the predetermined threshold, including;

a threshold holding means for holding said predetermined threshold;

a comparison means for comparing said differential motion vector with said predetermined threshold;

a fixed length coding means for fixed length coding a detected motion vector when said differential motion vector is greater than said predetermined threshold; and a variable length coding means for variable length coding the detected motion vector when said differential motion vector is equal or smaller than said predetermined threshold, wherein an average of the variable length coded differential motion vector is equal or smaller than the fixed length motion vector;

wherein the coded prediction error, one of the coded difference motion vector and the coded motion vector, and information indicating which one of the differential motion vector and the motion vector has been coded are multiplexed together and then outputted on a transmission path.

20. The motion picture coding apparatus of claim 19, wherein said comparison means compares each component of said differential motion vector with said predetermined threshold, said fixed length coding means fixed length codes each component of said means variable length codes each component for said differential motion vector.

21. The motion picture coding apparatus of claim 20, wherein said motion picture is based on one of Common Intermediate Format and Quater Common Intermediate Format, both of which are defined by ITU Recommendation H. 261, said predetermined threshold is 2, said fixed length code is 5 bit long, and the variable length coding is based on the International Telecommunication Union H. 261.

22. A motion picture coding apparatus for coding a prediction error and further coding a motion vector used for obtaining the prediction error, comprising:

a block division means for dividing a target frame into a plurality of blocks, said target frame being a frame to be coded;

a motion vector detection means for detecting a motion vector of each block in the target frame to a corresponding block in a reference frame, said reference frame being a former target frame;

a prediction error coding means for coding a difference between a block having a detected motion vector and a corresponding block in the reference frame, said difference being said prediction error;

a local decoding means for decoding said prediction error, thereby reproducing a block having the detected motion vector;

a frame memory means for holding all reproduced blocks for the reference frame and for sequentially storing blocks reproduced by said local decoding means;

a motion vector storage means for storing motion vectors of all blocks in the reference frame, wherein said motion vector storage means has a first area for sequentially storing detected motion vectors for a first frame and a second area for sequentially storing detected motion vectors for a second frame which follows the first frame, whereby one of the first area and the second area always holds motion vectors of all blocks in a reference frame;

a differential motion vector detection means for detecting a differential motion vector between a motion vector detected by said motion vector detection means and a motion vector of a corresponding block in the reference frame;

a coding means for coding a differential motion vector when a differential motion vector is equal or smaller than a predetermined threshold and for coding a motion vector when the differential motion vector is greater than the predetermined threshold including;

a threshold holding means for holding said predetermined threshold;

a comparison means for comparing said differential motion vector with said predetermined threshold;

a fixed length coding means for fixed length coding a detected motion vector when said differential motion vector is greater than said predetermined threshold; and a variable length coding means for variable length coding the detected motion vector when said differential motion vector is equal or smaller than said predetermined threshold, wherein an average of the variable length coded differential motion vector is equal or smaller than the fixed length motion vector; and a multiplexer means for multiplexing one of the coded differential motion vector and the coded motion vector with information indicating which one of the differential motion vector and the motion vector has been coded, and the coded prediction error, thereby being outputted on the transmission path, wherein said motion vector detection means detects the motion vectors based on the reference frame held in the frame memory means.

23. The motion picture coding apparatus of claim 22, wherein said comparison means compares each component of said differential motion vector with said predetermined threshold, said fixed length coding means fixed length codes each component of said motion vector, and said variable length coding means variable length codes each component for said differential motion vector.

24. A motion picture decoding apparatus for decoding a coded prediction error for each block between a target frame and a reference frame, said target frame being a frame to be decoded and said reference frame being a frame that precedes said target frame, and for further decoding a coded differential motion vector between each block in the target frame and a corresponding block in the reference frame, said motion picture decoding apparatus comprising:

a motion vector storage means for storing motion vectors of all blocks in the reference frame, including a first area for sequentially storing motion vectors for a first frame, which have been obtained in said motion vector addition means and a second area for sequentially storing detected motion vectors for a second frame which follows the first frame, whereby one of the first area and the second area always holds motion vectors of all blocks in a reference frame;

a differential motion vector decoding means for decoding a coded differential motion vector, thereby obtaining a differential motion vector;

a motion vector addition means for adding the differential motion vector obtained by said differential motion vector decoding means and a motion vector of a corresponding block in the reference frame, thereby obtaining a motion vector to be used for decoding the prediction error;

an error detection means for detecting a presence of an error in a coded differential motion vector;

a prevention means for preventing said motion vector storage means and said motion vector addition means from processing a differential motion vector, when the differential motion vector has been detected to have an error; and an amendment means for, when a presence of an error has been detected, storing to said motion vector storage means a motion vector of a predetermined block instead of a motion vector having the error, said predetermined block being stored in said motion vector storage means.

25. The motion picture decoding apparatus of claim 24, wherein said predetermined block is one of a block which is adjacent to the block whose motion vector has the error and a block which is located in a same position in the reference frame as the block whose motion vector has the error.

26. A motion picture coding method for dividing each frame which forms a motion picture into a plurality of blocks, for coding a prediction error in each of the blocks between a target frame and a reference frame, said target frame being a frame to be coded and said reference frame being a frame that precedes said target frame, and for further coding a motion vector to be used for obtaining the prediction error, said motion picture coding apparatus comprising:

detecting a motion vector for each block in the reference frame and for each block in the target frame;

storing in a memory the motion vectors of all blocks in the reference frame and of all blocks in the target frame; wherein the motion vector storing step includes an operation of sequentially storing detected motion vectors for a first frame to a first area of the memory and another operation of sequentially storing detected motion vectors for a second frame which follows the first frame to a second area of memory, whereby one of the first area and the second area of the memory always holds motion vectors of all blocks in a reference frame;

detecting a differential motion vector between a motion vector in a target frame and a motion vector of a corresponding block in the reference frame stored in the memory; and coding a differential motion vector when a differential motion vector is equal or smaller than a predetermined threshold in a first mode of coding and coding a motion vector when the differential motion vector is greater than the predetermined threshold in a second mode of coding, wherein said coding step comprises the steps of:

holding a predetermined threshold;

comparing said differential motion vector with said predetermined threshold;

fixed length coding a detected motion vector when said differential motion vector is greater than said predetermined threshold as a second mode of coding; and variable length coding a detected motion vector when said differential motion vector is equal or smaller than said predetermined threshold as a first mode of coding, wherein an average of the variable length coded differential motion vector is equal or smaller than the fixed length coded motion vector, and wherein the coded prediction error, one of the coded different motion vector and the coded motion vector, and information indicating which one of the differential motion vector and the motion vector has been coded are multiplexed together and then outputted on a transmission path.

27. The motion picture coding method of claim 26, wherein the comparing step compares each component of said differential motion vector with said predetermined threshold, the fixed length coding step fixed length codes each component of said motion vector, and the variable length coding step variable length codes each component for said differential motion vector.

28. A motion picture coding method for coding a prediction error and further coding a motion vector used for obtaining the prediction error, said motion picture coding method comprising the steps of:

dividing a target frame into a plurality of blocks, said target frame being a frame to be coded;

detecting a motion vector of each block in the target frame to a corresponding block in a reference frame, said reference frame being a former target frame;

coding a difference between a block having a detected motion vector and a corresponding block in the reference frame, said difference being said prediction error;

decoding said prediction error, thereby reproducing a block having the detected motion vector;

storing all reproduced blocks for the reference frame to a temporary storage unit and sequentially storing blocks reproduced in the decoding step to the temporary storage unit;

storing motion vectors of all blocks in the reference frame to a memory, including an operation of sequentially storing detected motion vectors for a first frame to a first area of the memory and another operation of sequentially storing detected motion vectors for a second frame which follows the first frame to a second area of the memory, whereby one of the first area and the second area of the memory always holds motion vectors of all blocks in a reference frame;

detecting a motion vector of each block in the target frame to a corresponding block in the reference frame;

detecting a differential motion vector between a motion vector detected by said motion vector detection step and a motion vector of a corresponding block in the reference frame stored in the memory;

coding a differential motion vector when a differential motion vector is equal or smaller than a predetermined threshold and coding a motion vector when the differential motion vector is greater than the predetermined threshold including;

holding a predetermined threshold;

comparing said differential motion vector with said predetermined threshold;

fixed length coding a detected motion vector when said differential motion vector is greater than said predetermined threshold; and variable length coding a detected motion vector when said differential motion vector is equal or smaller than said predetermined threshold, wherein an average of the variable length coded differential motion vector is equal or smaller than the fixed length coded motion vector; and multiplexing one of the coded differential motion vector and the coded motion vector with information indicating which one of the differential motion vector and the motion vector has been coded, and the coded prediction error, thereby outputting on the transmission path, wherein the step of detecting a motion vector is based on the reference frame held in the memory.

29. The motion picture coding method of claim 28, wherein the comparing step compares each component of said differential motion vector with said predetermined threshold, the fixed length coding step fixed length codes each component of said motion vector, and the variable length coding step variable length codes each component for said differential motion vector.

* * * * *